US012555479B2

(12) United States Patent
Mangialardi

(10) Patent No.: US 12,555,479 B2
(45) Date of Patent: Feb. 17, 2026

(54) COMPLIANCE METHOD AND SYSTEM FOR TRAFFIC CONTROL DEVICES

(71) Applicant: Smart Infrastructure Maintenance Applications Inc., Markham (CA)

(72) Inventor: Dominic Mangialardi, Markham (CA)

(73) Assignee: Smart Infrastructure Maintenance Applications Inc., Markham (CA)

( * ) Notice: Subject to any disclaimer, the term of this patent is extended or adjusted under 35 U.S.C. 154(b) by 427 days.

(21) Appl. No.: 18/061,106

(22) Filed: Dec. 2, 2022

(65) Prior Publication Data

US 2023/0206761 A1 Jun. 29, 2023

Related U.S. Application Data

(63) Continuation-in-part of application No. 15/568,306, filed as application No. PCT/CA2016/000125 on Apr. 22, 2016, now Pat. No. 11,560,677.

(60) Provisional application No. 62/151,397, filed on Apr. 22, 2015.

(51) Int. Cl.
*G08G 1/097* (2006.01)

(52) U.S. Cl.
CPC .................................... *G08G 1/097* (2013.01)

(58) Field of Classification Search
CPC ...................................................... G08G 1/097
USPC ........................................................... 340/907
See application file for complete search history.

(56) References Cited

U.S. PATENT DOCUMENTS

| | | | | |
|---|---|---|---|---|
| 6,710,774 | B1 * | 3/2004 | Kawasaki | G01C 21/3638 345/419 |
| 8,737,915 | B2 * | 5/2014 | Beenken | B60R 13/10 455/41.3 |
| 2007/0050129 | A1 * | 3/2007 | Salmre | G01C 21/367 701/408 |
| 2009/0102653 | A1 * | 4/2009 | McGinnis | G06Q 10/087 705/28 |
| 2009/0124303 | A1 * | 5/2009 | Twitchell, Jr. | H04W 84/18 455/574 |
| 2014/0366411 | A1 * | 12/2014 | Sirosaki | G06K 7/10009 40/208 |
| 2018/0179712 | A1 * | 6/2018 | Mangialardi | G09F 13/16 |
| 2023/0206761 | A1 * | 6/2023 | Mangialardi | G08G 1/095 340/931 |
| 2025/0020460 | A1 * | 1/2025 | Shiga | B60P 1/00 |

* cited by examiner

*Primary Examiner* — Qutbuddin Ghulamali
(74) *Attorney, Agent, or Firm* — Tucker Ellis LLP; Michael G. Craig

(57) ABSTRACT

A sign post for supporting a sign, the sign post comprising: a support member; the sign comprising having a planar sign face and an opposing planar back face, wherein the sign is affixed to the support member; a compliance module comprising a printed circuit board comprising circuitry for receiving measurements associated with at least one condition of the sign post and transmitting data; and an enclosure for housing the compliance module.

14 Claims, 16 Drawing Sheets

440

460

480

COMPLIANCE METHOD AND SYSTEM FOR TRAFFIC CONTROL DEVICES

CROSS-REFERENCE TO RELATED APPLICATIONS

The present application is a continuation-in-part of U.S. patent application Ser. No. 15/568,306, filed Oct. 20, 2017, which is incorporated by reference herein in its entirety, which claims priority to U.S. Provisional Patent Application Ser. No. 62/151,397, filed on Apr. 22, 2015, which is incorporated by reference herein in its entirety.

BACKGROUND

The present disclosure relates to traffic control devices, more particularly it relates to methods and systems for managing traffic control devices and maintenance thereof.

Traffic signs are a vital component of road safety and traffic efficiency. A major concern of transportation agencies throughout the world is to develop a method to effectively and efficiently maintain roadway infrastructure. Maintaining traffic signs is becoming increasingly difficult for agencies faced with budget constraints, growing traffic congestion and new referred to as the "Handbook", 1983 edition, published by the U.S. Department of Transport under the Federal Highway Administration, places traffic signs in three categories: regulatory; warning and guide signs. Regulatory signs (e.g., Stop sign) inform drivers of traffic laws and regulations; warning signs (e.g., Curve Ahead sign) alert drivers to traffic of unusual or potentially hazardous conditions on or adjacent a street or highway; and guide signs give drivers specific information to assist with wayfinding and navigation. In all categories however, particularly in the regulatory and warning categories, the signs convey only one traffic message, and no secondary traffic message or information is imparted by the signs. Traffic signs may include but are not limited to: Checkerboard; Curve sign with advisory speed tab; Do Not Enter; Load Restricted Bridge; Low Bridge; Low Bridge Ahead; One Way; Stop; Stop Ahead; Stop Ahead; Traffic Signal Ahead; Two-Way Traffic Ahead; Wrong Way; Yield; Yield Ahead; Yield Ahead and New. Other signs include school signs such as: School Zone Ahead; School Zone Speed Limit; End School Zone; and emergency management and civil defense signs such as: Emergency Shelter; Hurricane Shelter; Hurricane Evacuation Route; Traffic Control Point; Area Closed.

The traffic signs are generally made from metal blanks and include retroreflective material for nighttime visibility of the traffic message or symbol. However, with the passage of time, due to a breakdown in the pigments or reflective material in the sheeting material, these signs generally degrade and become less retroreflective, and their effectiveness in communicating regulatory, warning, and guidance messages to road users at nighttime diminishes to the point when the signs cannot be deciphered or read in time for a driver to react properly. Thus, to maintain nighttime effectiveness and remain compliant with the maintenance standards set by governing bodies, signs are required to be replaced before they reach the end of their useful retroreflective life. For example, ONTARIO REGULATION 239/02 of the Municipal Act sets out the minimum maintenance standards for municipal highways, and mandates one inspection per calendar year to verify and record whether the regulatory signs or warning signs meet the retro-reflectivity requirements of the Ontario Traffic Manual. Any sign that is illegible, improperly oriented, obscured, or missing, must be repaired or replaced expeditiously.

Replacement of signs is typically based on evaluation or management methods. Evaluation methods involve some type of assessment of the nighttime visibility of individual signs (e.g., visual inspection or retro-reflectivity measurement); whereas management methods are based on the expected retroreflective life of the overall sign inventory, and based on factors such as warranties, demonstrated performance, or control sign assessments. Assessment of the nighttime visibility of individual signs involves a formal visual inspection procedure by a trained inspector from a moving vehicle during nighttime conditions. Signs that are visually identified by the inspector to have retro-reflectivity below the minimum levels are slated for replacement. In another method, sign retro-reflectivity is measured using a retro-reflectometer, and signs with retro-reflectivity below the minimum levels are slated for replacement. In yet another method, the age of the sign (based on the installation date) is compared to the expected sign life (based on the historical data of sign retro-reflectivity degradation in a geographic area), and signs older than the expected life are slated for replacement. Another method involves a blanket replacement of all signs in an area or corridor, or signs of a given type at specified intervals. This method eliminates the need to assess retro-reflectivity or track the life of individual signs. The replacement interval is based on the expected sign life of the sign material in a particular geographical location, or based with the shortest life of the sign material on a given sign type.

In addition, the increase in liability lawsuits related to the condition and placement of traffic signs underscores the importance of ensuring that signs are maintained in a desirable condition. Accordingly, various sign management systems have been proposed, and most of these systems rely on paper-based reporting, organizing, and storage methods. Other sign management systems keep track of signs by manually scanning barcodes affixed to signs, and storing the barcode information in a database for use with conventional asset management software. However, the durability of these barcodes is substantially reduced due to the weather conditions, and readability is affected by dirt, mud, snow or ice, notwithstanding the requirement for line-of-sight reading. Accordingly, bar code technology may be relatively unreliable.

Other systems employ vehicle-mounted camera systems which record video along a selected route to capture signs, and the captured video data is then painstakingly analyzed. These systems are associated with relatively high operational costs, as each vehicle includes at least one driver, an inspector, camera units, and control, recording, playback, and processing units. Yet another system is based on global positioning systems (GPS) to locate signs, however, such systems suffer from decreased accuracy.

SUMMARY

In one of its aspects, a computer-implemented compliance system for traffic control devices that takes into account the full characteristics of each traffic control device and establishes a risk assessment based on regulatory requirements, and then based upon the aforementioned characteristics and the risk assessment generates a recommendation and/or action to be taken to comply with the regulatory requirements. Advantageously, the compliance system increases inventory efficiency, reduce data errors, and mitigates liability issues.

In yet another aspect, a sign post for supporting a sign, the sign post comprising:

a support member;

the sign comprising having a planar sign face and an opposing planar back face, wherein the sign is affixed to the support member;

a compliance module comprising a printed circuit board comprising circuitry for receiving measurements associated with at least one condition of the sign post and transmitting data; and an enclosure for housing the compliance module.

In another aspect, a compliance management unit for determining a condition of a sign post for supporting a sign, the compliance system comprising:

a database for storing a record pertaining to attributes of each of the at least one of the sign and the sign post, each of the at least one of the sign and the sign post having unique identifier;

a computer readable medium comprising instructions stored thereon and executable by a processing structure to cause said processing structure to at least:

determine the condition of each of the at least one of the sign and the sign post based on predetermined criteria and acquired measurements data associated with each of the at least one of the sign and the sign post; and establish a compliance risk assessment for each of the at least one of the sign and the sign post based on predefined rules, and then based on said compliance risk assessment, generate a recommendation and/or action to be taken for compliance.

In yet another aspect, a compliance system for determining a condition of at In yet another aspect, a compliance method for at least one of a sign and a comprising the steps of:

receiving at least one of sensed data acquired from at least one sensor associated with the at least one of the sign and the sign post, identification data, attribute data, and location data associated with the at least one of the sign and the sign post;

querying a compliance database having records associated with each of the at least one of the sign and the sign post;

determining a condition of each of the at least one of the sign and the sign post based on the at least one of the identification data, the attribute data, the acquired sensed data and the location data, predetermined criteria and maintenance data;

establishing a compliance risk assessment for each of the at least one of the sign and the sign post; and based on said compliance risk assessment, generating a recommendation and/or action to be taken to comply with predefined requirements.

In one of its aspects, a sign comprising:

a substrate having a planar sign face and an opposing planar back face having peripheral side edges;

a recessed portion formed within said substrate having an opening and a bottom, and side walls;

a RFID tag assembly having a metal shielding sheet, said RFID tag assembly having a mounting substrate, a double-sided adhesive sheet with one side adhered to a metal shielding sheet and an opposing side adhered to said bottom of said recessed portion;

a retroreflective sheeting having a double-sided pressure-sensitive adhesive sheeting for application over said RFID tag assembly to hermetically seal said RFID tag assembly within said recessed portion; and a translucent vinyl backed material with primary indicia applied to said retroreflective sheeting.

In yet another aspect, a compliance system for traffic control devices, the system comprising:

each of said traffic control devices having an RFID tag associated with a unique tag identifier and a unique traffic control device identifier;

a database for storing a record pertaining to attributes of each of said traffic control devices, wherein said record is associated with at least one of a unique tag identifier and a unique traffic control device identifier;

a compliance module comprising instructions stored in memory and executable by a processing structure to cause said processing structure to at least:

determine the age of each of said traffic control devices;

determine the condition of each of said traffic control devices based on predetermined criteria and maintenance data associated with each of said traffic control devices; and establish a compliance risk assessment for each of said traffic control devices based on regulatory requirements, and then based on said compliance risk assessment, generate a recommendation and/or action to be taken to comply with said regulatory requirements.

In yet another aspect, a compliance method for traffic control devices, the method comprising the steps of:

receiving a unique RFID tag identifier associated with each of said traffic control devices;

querying a compliance database having records associated with each of said traffic control devices corresponding to said unique RFID tag identifier;

determining an age of each of said traffic control devices and condition of each of said traffic control devices based on predetermined criteria and maintenance data associated with each of said traffic control devices;

establishing a compliance risk assessment for each of said traffic control devices based on regulatory requirements; and based on said compliance risk assessment, generating a recommendation and/or action to be taken to comply with said regulatory requirements.

In yet another aspect, a sign comprising:

a substrate having a planar sign face and an opposing planar back face having peripheral side edges;

a recessed portion formed within said substrate;

contained within said recessed portion at least one of a RFID tag assembly, an accelerometer; a global positioning system (GPS) sensor; processing circuitry comprising, a microprocessor and a computer readable medium, a communications interface module with a transceiver for emitting radio signals, and for receiving radio signals, a power unit;

a retroreflective sheeting for application over said recessed portion; and a translucent vinyl backed material with primary indicia applied to said retroreflective sheeting.

Advantageously, the compliance system identifies and authenticates each item individually, increases inventory efficiency, reduces data errors, and mitigates liability issues.

BRIEF DESCRIPTION OF THE DRAWINGS

Several exemplary embodiments of the present invention will now be described, by way of example only, with reference to the appended drawings in which.

DETAILED DESCRIPTION

Figure 1:
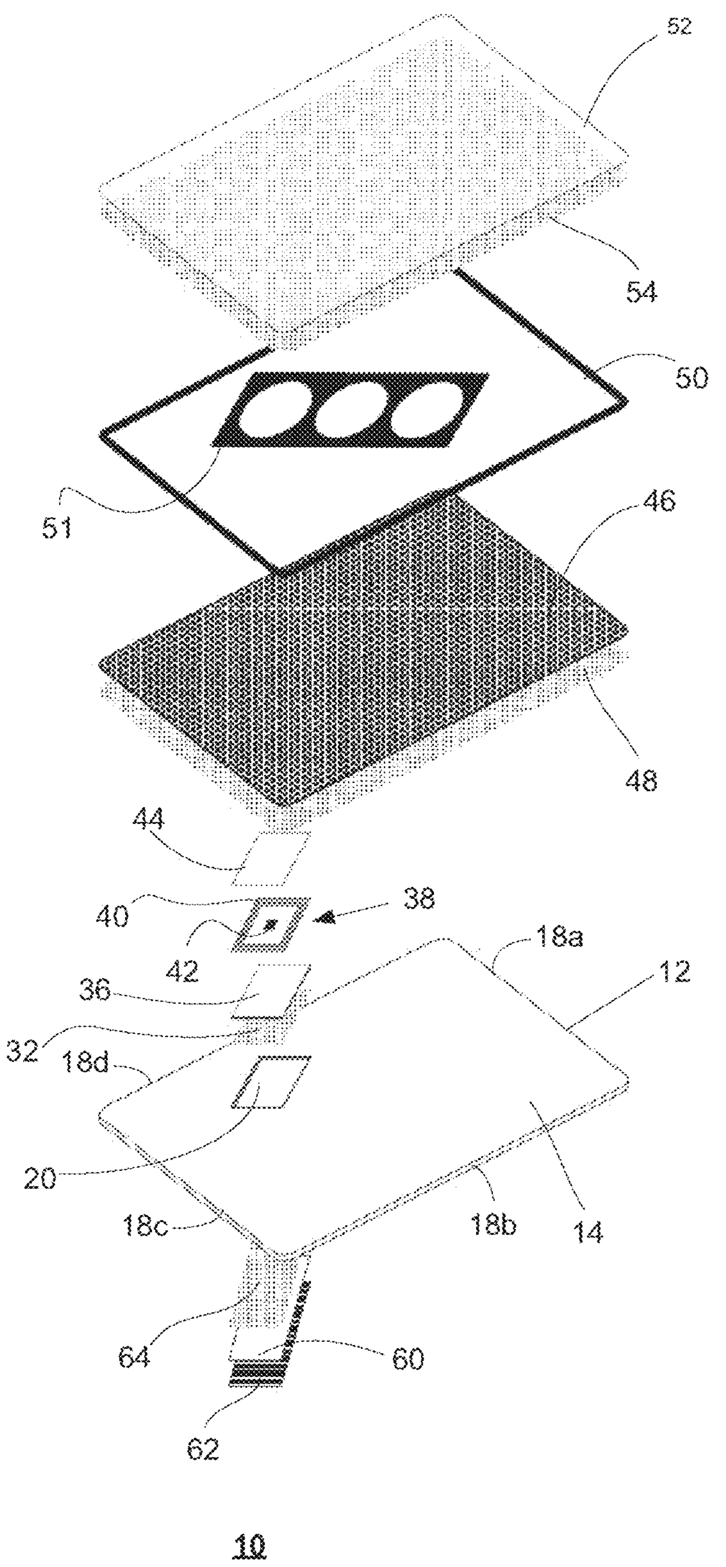
FIG. 1 shows an exploded view of an exemplary road sign.
Figure 2:
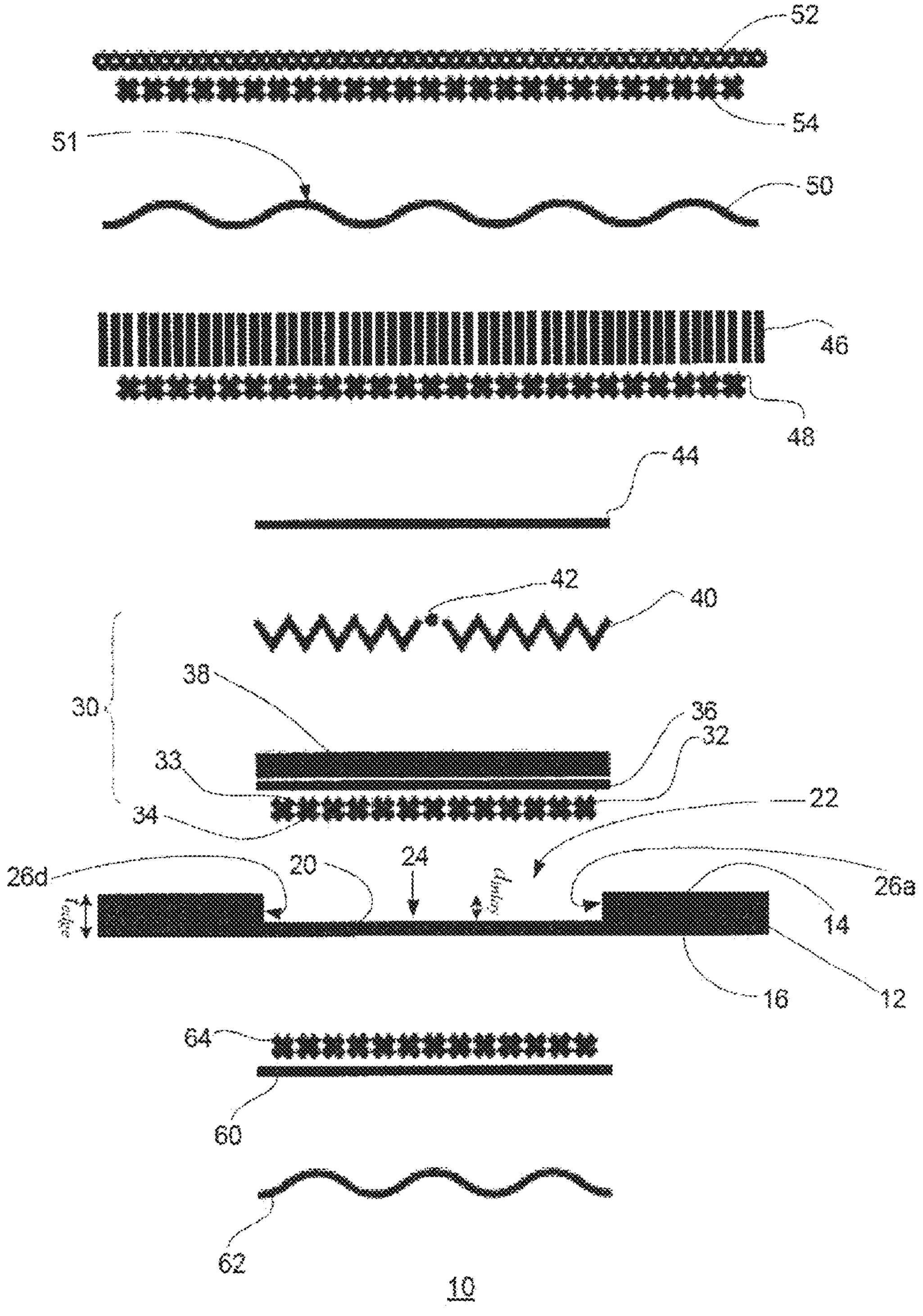
FIG. 2 shows a cross-section of the exemplary road sign of FIG. 1.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the dis-closed methods. Accordingly, the following detailed description does not limit the disclosure. Instead, the proper scope of the disclosure is defined by the appended claims.

Moreover, it should be appreciated that the particular implementations shown and described herein are illustrative of aspects of the invention and are not intended to otherwise limit the scope of the aspects of the invention in any way. Indeed, for the sake of brevity, certain sub-components of the in-dividual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

FIG. 1 shows an exploded view of an exemplary road sign, generally identified by reference numeral 10, in an exemplary embodiment. Sign 10 comprises a substrate 12 made from properly prepared metallic blanks for desired adhesion and sign durability, and for support of fastening means, such as screws, rivets, nuts and bolts for affixing sign 10 to a post or surface. Substrate 12 includes opposing planar faces, that is, sign face 14 and back face 16, having peripheral side edges 18*a-d* of a known thickness ($t_{edge}$). Sign face 14 of substrate 12 is chemically cleaned and etched or mechanically abraded in accordance with the American Society for Testing and Materials (ASTM) standards, or equivalent guidelines from other standards issuing bodies. The back face 16 is rendered dull and non-reflective either by mechanical or chemical means. Substrate 12 may comprise a plurality of shapes dependent of the message sign 10 is to impart, for example, a rectangular shaped substrate 12 is commonly employed for information signage, while an octagonal shaped substrate is associated with a primary traffic symbol. The metallic blanks may be made from aluminum or zinc/aluminum alloy coated structural steel, among others.

Substrate 12 comprises recessed portion 20 with an opening 22 on sign face 14, bottom 24, including side walls 26*a-d* with a depth ($d_{inlay}$) from opening 22 dimensioned to be less than the thickness ($t_{edge}$) of substrate 12.

Radio-frequency identification (RFID) tag assembly 30 is received by recessed portion 20, and RFID tag assembly 30 includes double-sided adhesive sheet 32 with one side 33 applied to bottom 24, and opposing side 34 adhered to metal shielding sheet 36 associated with RFID mounting substrate 38. RFID tag assembly 30 includes integrated circuit (IC) chip 40 and antenna 42 is mounted on RFID mounting substrate 38. IC chip 40 comprises memory for storing a unique identifier associated with RFID tag assembly 30, and may include attribute data, as well be described later. Paper label 44 may be applied over RFID tag assembly 30, and may include details pertaining to the characteristics of RFID tag assembly 30, such as manufacturer, operating frequency, and so forth. RFID tag assembly 30 is dimensioned to fit within recessed portion 20 such that the thickness of RFID tag assembly 30 is equal to or less than $d_{inlay}$, such that RFID tag assembly 30 does not protrude therefrom, and is protected from any pressure exerted during the manufacture of sign 10, or while in operation.

Retroreflective sheeting 46 is applied to sign face 14 via double-sided pressure-sensitive adhesive sheeting 48. Accordingly, retroreflective sheeting 46 and adhesive sheeting 48 hermetically seal RFID tag assembly 30 within recessed portion 20, such that RFID tag assembly 30 is protected from damage due to rain, dirt, sun, wind and snow, or vandalism. Translucent vinyl backed material 50 with primary indicia 51, such as screened ink, is applied to retroreflective sheeting 46, and an anti-graffiti sheet 52 may be applied over transparent vinyl backed material 50 via adhesive sheet 54. Indicia 51 comprises traffic symbols, images and alphanumeric characters.

Anti-graffiti sheet 52 is a clear film designed to be applied over the retroreflective sign face 14 during sign manufacture and act as a barrier layer between graffiti and the underlying sign face material. The use of such film over a screen-printed face allows graffiti to be removed without removing indicia 51 as well, allowing reasonable sign reclamation without needing to replace it with a new sign. Label sticker 60 with secondary indicia 62, such as a barcode may be applied to back face 16 via label adhesive 64. Indicia 62 may also include municipal details and/or sign manufacturer details.

Figure 3:
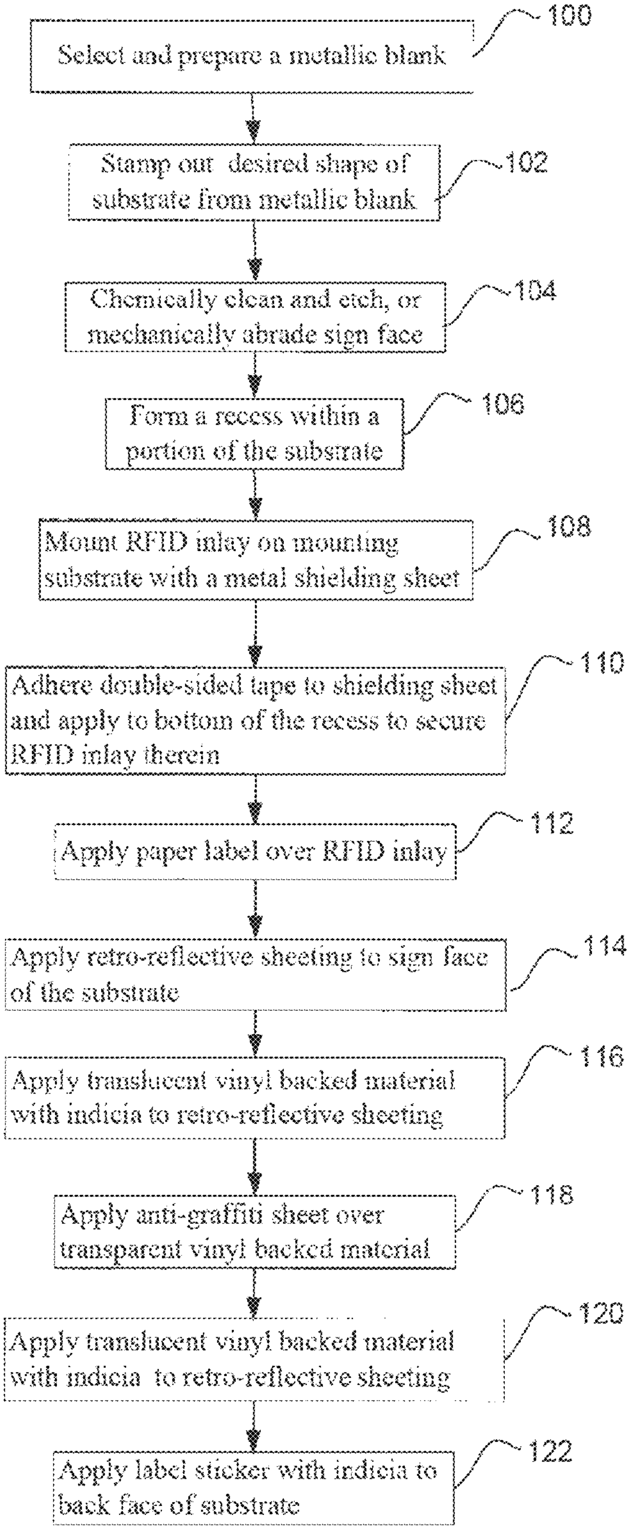
FIG. 3 shows a high-level flow diagram illustrating an exemplary process steps for manufacturing the road sign.

Turning now to FIG. 3, there is shown a high-level flow diagram illustrating exemplary process steps for manufacturing an exemplary sign 202*a*, 202*b*, or 202*c*. The process comprises the steps of: selecting and preparing a metallic blank for desired adhesion and sign durability and support for fastening means (step 100). The metal blank may be made from sheet metal material, such as aluminum, provided in the form of cut or blanked panel, and is generally a planar sheet metal component with an outer periphery having a pair of opposing edges. Next, a substrate 12 is stamped out or punched out from the metal blank in a shape corresponding to a desired sign (step 102); for example, a rectangular shaped substrate is commonly employed for information signage, while an octagonal shaped substrate is associated with a primary traffic symbol. Other shapes include circles, triangles, diamonds, and hexagons, among others. Next, sign face 14 is chemically cleaned and etched or mechanically abraded in accordance with the American Society for Testing and Materials (ASTM) standards, or equivalent guidelines from other standards issuing bodies (step 104). Back face 16 is rendered dull and non-reflective either by mechanical or chemical means.

Next, recess 20 is formed within substrate 12, and includes opening 22 on sign face 14, bottom 24, and side walls 26*a-d* (step 106). Side walls 26*a-d* comprise a depth ($d_{inlay}$) from opening 22 dimensioned to be less than the thickness ($t_{edge}$) of the substrate 12. In step 108, integrated circuit (IC) chip 40 and antenna 42 are mounted on RFID mounting substrate 40 with metal shielding sheet 36, and double-sided adhesive sheet 32 to form RFID tag assembly 30. Next, RFID tag assembly 30 is placed in recess 20 and secured therein via double-sided adhesive sheet 32 with one side 33 adhered to metal shielding sheet 36 and opposing side 34 engaging bottom 24 of recess 20 (step 110). RFID tag assembly 30 is dimensioned to fit within recessed portion 20 such that the thickness of RFID tag assembly 30 is equal to or less than $d_{inlay}$, such that RFID tag assembly 30 is housed therein without protruding beyond sign face 14. Accordingly, RFID tag assembly 30 is protected from any pressure exerted during the manufacture of the article or during its use. Next, paper label 44 is applied over RFID tag assembly 30 (step 112), and paper label 44 may include details pertaining to characteristics of RFID tag assembly 30, such as manufacturer, operating frequency, and so forth.

In step 114, retroreflective sheeting 46 is applied to sign face 14 via double-sided pressure-sensitive adhesive sheeting 48. Accordingly, retroreflective sheeting 46 and adhesive sheeting 48 hermetically seal RFID tag assembly 30 within recessed portion 20, such that RFID tag assembly 30 is protected from the elements, such as rain, dirt, sun, wind and snow. Advantageously, damage of RFID tag assembly 30 is substantially diminished and the operating life is greatly enhanced. Next, translucent vinyl backed material 50 with indicia 51, corresponding to the message the sign is to convey, is applied to retroreflective sheeting 46 (step 116), and anti-graffiti sheet 52 may be applied over transparent vinyl backed material 50 via adhesive sheet 54 (step 118). In step 120, label sticker 60 with indicia, such as barcode 62, is applied to back face 16 via label adhesive 64. Indicia 62 may also include municipal details and/or sign manufacturer details.

Figure 4:
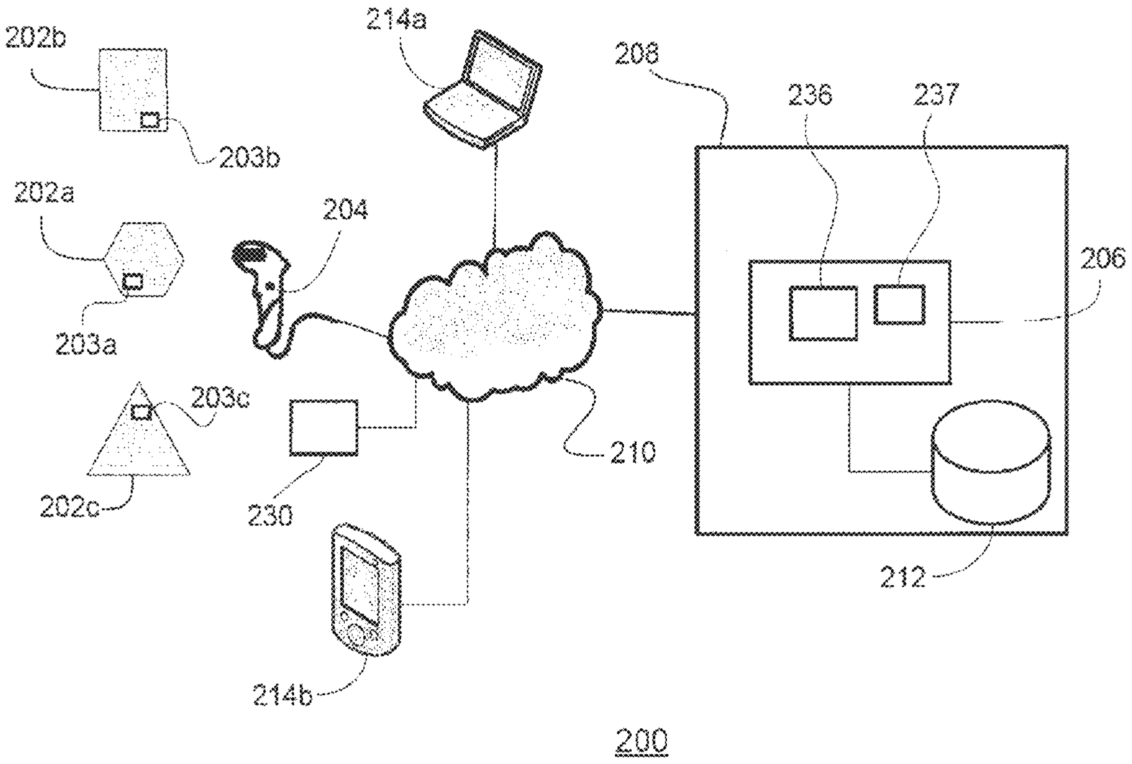
FIG. 4 shows a high-level system diagram illustrating an exemplary sign compliance management system.

Turning now to FIG. 4, there is shown a high-level system diagram illustrating an exemplary sign compliance management system, generally designated by numeral 200. A plurality of signs 202*a*, 202*b*, and 202*c* are located on roadways in a geographical area. As noted above, each sign 202*a*, 202*b*, 202*c* includes RFID tag assembly 302*a*, 302*b*, 302*c*, respectively, embedded at the point of manufacture. The IC chip 40 includes memory which stores the unique tag ID, unique sign ID data, and may include sign attribute data, such as, installation date, sign type, dimensions, substrate material, grade and manufacturer of reflective sheeting, manufacturer's name, batch number, manufacturer's certificate of conformity with government specifications, material grade, date of delivery, date of use and Material Data Sheet (MDS), location, jurisdiction (municipality, provincial, state, federal), Manual of Uniform Traffic Control Devices (MUTCD) Code, face direction, sign face condition assessment, inspection date, reason for critical rating, last inspection dates and results, recent maintenance events, next scheduled inspection/maintenance.

Reading and writing (data calling, registration, deletion, updating, and others) of RFID tag assembly 30 is executed by reader/writer 204 via antenna 42 which interrogates RFID tag assembly 30 to acquire data recorded in the memory associated with IC chip 40. Various frequency bands may be used with the RFID tag assembly 30, e.g., LF band (125 kHz), HF band (13.56 MHz), UHF band (960 MHz) and SHF band (2.45 GHz), among others. A communication distance enabling wireless communication differs depending on a frequency band to be used, and an optimum antenna length varies depending on a frequency band.

RFID reader 204 includes electronic circuitry comprising a transceiver associated with a suitable antenna, which interrogates RFID tag assemblies 302*a*, 302*b*, 302*c*, to acquire the stored sign data. The sign data is transmitted to a computing system 206 of a sign compliance management unit 208 via communications network 210, such as the Internet, and/or any other suitable network. Examples of computing system 206 may include, but are not limited to: a personal computer, a server computer, a series of server computers, a minicomputer, and a mainframe computer. For example, server computer 206 comprises one or more databases 212, which may be any type of data repository or combination of data repositories, which store records or other representations of data. Accordingly, sign data is stored on databases 212 and is accessible to user devices 214*a*, 214*b* via server computer 206. Databases 212 may also include information pertaining to inspection programs (day and night), reflectivity tests, quality control, and warehouse and field inventories. Accordingly, RFID tag assembly 30 stores field data or a field report about each of sign 202*a*, 202*b*, or 202*c*, its operation and its maintenance/inspection history, such that each road sign 202*a*, 202*b*, 202*c* may be tracked throughout the whole duration of its useful life.

Alternatively, some or all of the foregoing sign attribute data, with the exception of the unique tag ID or unique sign ID, can be stored in a searchable database residing in the RFID reader 204, server computer 206 or user devices 214*a*, 214*b*. As an example, the RFID reader 204 receives the unique tag ID or unique sign ID from the RFID tag assembly 30 memory and then retrieves the data associated with that unique tag ID or unique sign ID from a database resident on RFID reader 204, or databases 212 associated with server computer 206 or user devices 214*a*, 214*b*.

Server computer 206 comprises sign compliance management module 236 having a sign compliance management process executable by a processor of server computer 206, in conjunction with the system database 212, to manage signs 202*a*, 202*b*, 202*c* of system 200. User devices 214*a*,

214*b* allow a user to view information, or administer information on system 200. User devices 214*a*, 214*b* may be in the form of any kind of general processing structure, and may for example include any device, such as, a personal computer, laptop, computer server, handheld user device (e.g. personal digital assistant (PDA), mobile phone, tablet, smartphone).

Figure 5:
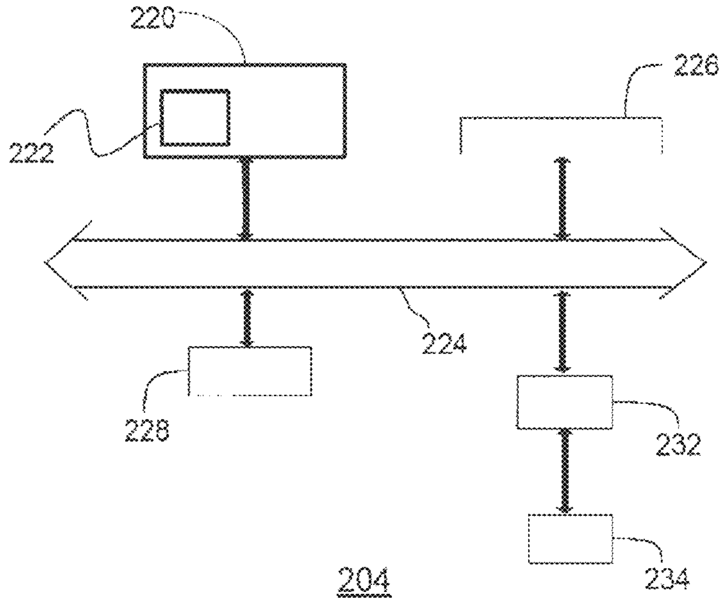
FIG. 5 shows a schematic diagram of an exemplary RFID reader.

Now turning to FIG. 5, there is shown a schematic diagram of an RFID reader 204, comprising processing and control module 220 having processing circuitry, such as, microprocessor 222, which is arranged to communicate, via system bus 224, with memory 226. The skilled person will appreciate that memory 226 may be provided by a variety of components including a volatile memory, a hard drive, a non-volatile memory, etc. Indeed, memory 226 comprises a plurality of components under the control of, or otherwise connected to, processor 222. However, typically memory 226 provides a program storage portion arranged to store program code which when executed performs an action, and a data storage portion which can be used to store data either temporarily and/or permanently.

RFID reader 204 also includes communications interface module 228 with a transceiver for transmitting signals, and for receiving signals from other road signs 202*a*, 202*b*, and 202*c* 10, as will be described in more detail below. Communications interface module 228 may include a wired interface, wireless interface, optical, IR interface or RF interface, and may use standard protocols such as SONET, SDH, Zigbee, Ethernet, Wi-Fi (e.g. IEEE 802.11a/b/g/n, WiMax), Bluetooth, powerline communication (e.g. IEEE 1901), GSM/GPRS, IS-41 (CDMA, TDMA, AMPS), or other standard and non-standard physical layers well known to those skilled in the art. In addition, communications interface module 228 enables connection to shared or remote drives, one or more networked computers 206, or other networked devices 214*a*, 214*b*, via communications network 210. Each RFID reader 204 includes a unique identifier, such as a media access control (MAC) address, which is registered with server computer 206. Alternatively, RFID reader 204 communicates with network-enabled wireless devices, such as Wi-Fi access point 230, and access point 230 transmits information obtained from the RFID reader 204 to server computer 206. Alternatively, RFID reader 204 is communicatively coupled to user device 214*a* or 214*b*, and user device 214*a* or 214*b* is communicatively coupled to server computer 206 via a communications interface module similar to communications interface module 228. RFID reader 204 may also include input/output controller 232 to which input/output devices 234, such as a keypad, keyboard or display unit, are coupled to.

A user can dynamically set a read/write range of RFID reader/writer 204, for example, RFID reader 204 can be set to read tags 203*a*, 203*b*, and 203*c* from a 12-inch range to a 30-foot range. The user can take an inventory of tags 203*a*, 203*b*, 203*c* in a selected range and upload the data to compliance management unit 208 in real-time, when RFID reader 204 is communicatively coupled to communication network 210. Alternatively, the inventory could be captured and uploaded to server computer 206 via a synchronizing process at user device 214*a* or 214*b*. Additionally, the users can enter a specific sign identifier or asset number on RFID reader 204, and RFID reader 204 will only locate the corresponding tag 203*a*, 203*b*, or 203*c* associated with the sign identifier within the range of RFID reader 204. Such RFID reader 204 may also be used to dynamically upload data to compliance management unit 208.

Each RFID reader 204 includes a unique identifier, such as a media access control (MAC) address, which is registered with server computer 206. Alternatively, RFID reader 204 communicates with network-enabled wireless devices, such as a Wi-Fi access point 230 which transmits information obtained from the RFID reader 204 to server computer 206. Alternatively, RFID reader 204 is communicatively coupled to user device 214*a* or 214*b*, and user device 214*a* or 214*b* is communicatively coupled to server computer 206 via a communications interface module similar to communications interface module 228. RFID reader 204 may also include an input/output controller 232 to which input/output devices 234, such as a keypad, keyboard or display unit, are coupled to.

Figure 6:
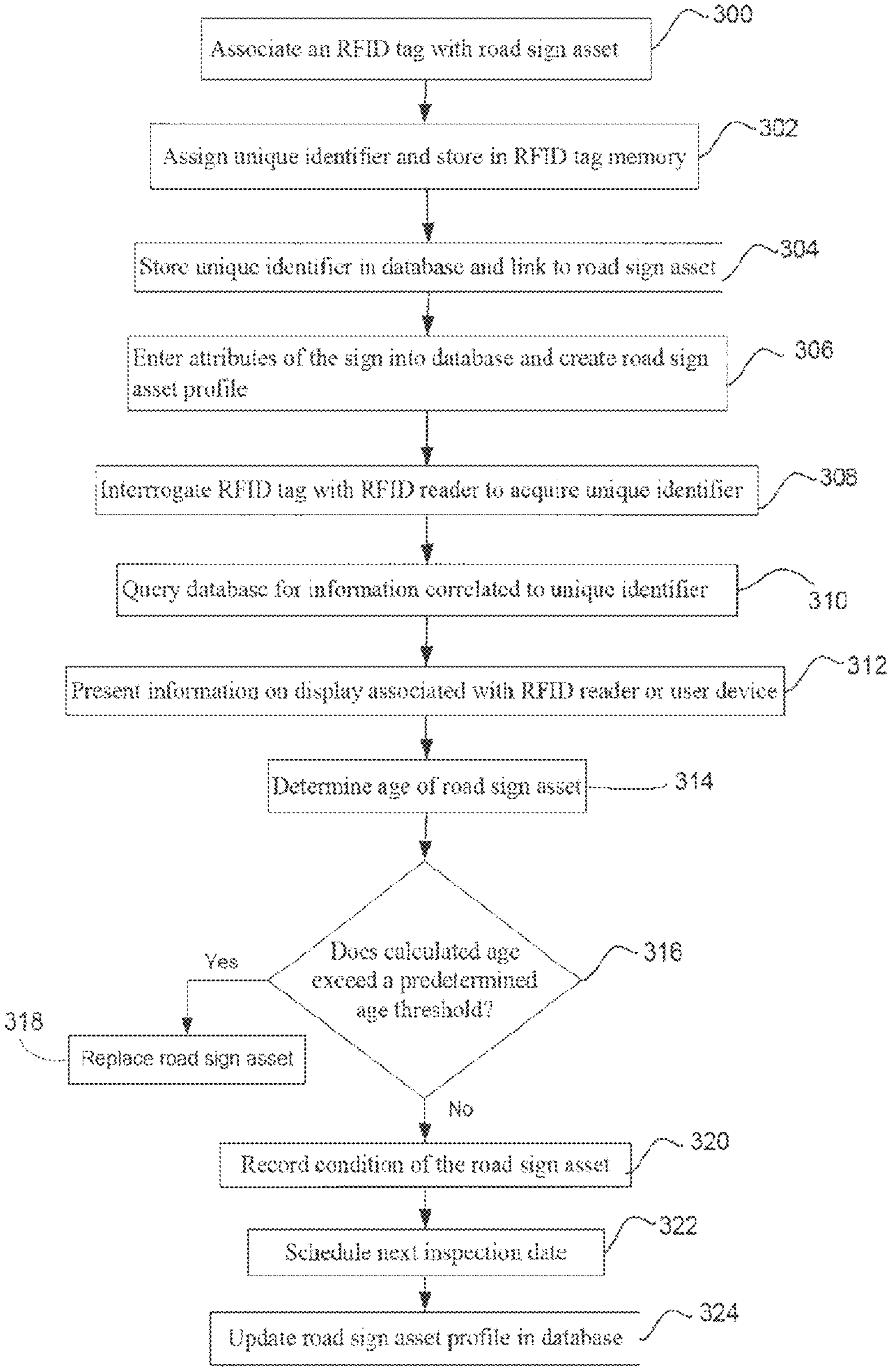
FIG. 6 shows a high level flow diagram illustrating an exemplary process steps for tracking a road sign.

FIG. 6 illustrates an exemplary process for tracking sign 202*a*, 202*b*, or 202*c* in system 200. In step 300, each road sign 202*a*, 202*b*, or 202*c* to be tracked is tagged with RFID tag 203*a*, 203*b*, or 203*c*. While each tag 203*a*, 203*b*, or 203*c* comprises a unique tag identifier (tag ID), a unique sign identifier (sign ID), such as a code pertaining to a particular jurisdiction e.g. municipality, province or state, may be assigned and stored within the memory of RFID tag 203*a*, 203*b*, or 203*c* (step 302). Accordingly, RFID reader/writer 204 transmits the unique sign identifier for storage in memory of RFID tag 203*a*, 203*b*, or 203*c*. In step 304, the unique tag identifier or a unique sign identifier is entered into database 212 and is relationally linked with sign 202*a*, 202*b* or 202*c* to which it is attached. Next, the attributes of sign 202*a*, 202*b* or 202*c* are entered into the database (step 306), and may include any of, sign type, dimensions, substrate material, grade and manufacturer of reflective sheeting, location, jurisdiction (municipality, provincial, state, federal), Manual of Uniform Traffic Control Devices (MUTCD) Code, face direction (e.g. E, N, NE, NW, S, SE, SW, W), sign face condition assessment, inspection date, reason for critical rating, last inspection dates and results, recent maintenance events, next scheduled inspection/maintenance, among others. For example, the assessment results in a rating of each sign in one of four categories, such as: “Critical” indicating immediate replacement is required; “Poor” indicating replacement is required within 12 months; “Fair” indicating that the sign is functional but has evidence of deterioration, and replacement is anticipated between 2 and 5 years; and “Good” indicating that there is no evidence of reduced performance and remaining service life is 5 years.

The attribute data also includes details of the sign type, such as regulatory, guide, warning, school, object/other. In addition, other attributes such as post type (e.g., building, fence, gate, I-beam, light pole, overpass, round, signal mast, signal pole, square, u-channel, utility pole), including the condition of the sign (e.g., critical, poor, fair, good). With respect to the “Fair” categorization, further attributes may include discolored, reflectivity, faded, graffiti, sticker, playbill, among others; while for “Critical” categorization, further attributes may include reflectivity, discolored, faded, obstructed, graffiti, among others.

Also, the post material (e.g., concrete, steel, wood, other) may be specified, including the condition of the post (e.g., critical, poor, fair, good). With respect to the “fair” categorization, further attributes may include damage, graffiti, leaning, rusted, and twisted, among others.

Once the unique tag identifier or a unique sign identifier and attributes of each road sign 202*a*, 202*b*, or 202*c* are entered in database 212, road sign 202*a*, 202*b*, 202*c* may be tracked and managed. For example, a user selects a particular geographical area to inspect road sign 202*a*, 202*b*, 202*c* on a geographical information system (GIS) map, and with RFID reader 204 interrogates an RFID tag 203*a* on road sign 202*a*, such as a "STOP" sign (step 308) to read the data in the RFID tag memory. For example, RFID reader 204 receives the unique tag ID or the unique sign ID and issues a query to database 212 (step 310) for information correlated to unique tag ID or the unique sign ID, such as sign attribute data. In step 312, the attributes of the sign 202*a*, as described previously, are presented to user device 214*a* or 214*b*, which may include the last inspection dates and results, or historical maintenance events, among others. Next, a comparison between the installation date and current date of inspection is performed to determine the age of sign 202 (step 314), and a determination whether the calculated age exceeds a predetermined age threshold for replacement is made (step 316). When the age threshold is exceeded, then sign 202*a* is scheduled for immediate replacement, or is replaced contemporaneously (step 318), otherwise other attributes visible to the user are noted, such as present condition of sign 202*a* is noted (e.g. "Fair", or "Good"), including the condition of the post type (step 320). Signs 202*a*, 202*b*, and 202*c* that are visually identified by the user and have retro-reflectivity below the minimum levels are also scheduled for replacement, or replaced contemporaneously. Once a sign 202*a* is replaced attributes such as the sheeting type and installation date are recorded in database 212 and a date for expected replacement of road sign 202*a*, 202*b* or 202*c* is determined based on its installation date, condition and other attributes.

Next, the next scheduled inspection or maintenance date is entered, or automatically calculated based on user-defined default inspection time frames or standards mandated inspection time frames (step 322). In the next step, details of the inspection or maintenance event pertaining to sign 202*a*, including the date/time of inspection, user identifier of the inspector, are recorded and database 212 is updated (step 324).

Figure 7:
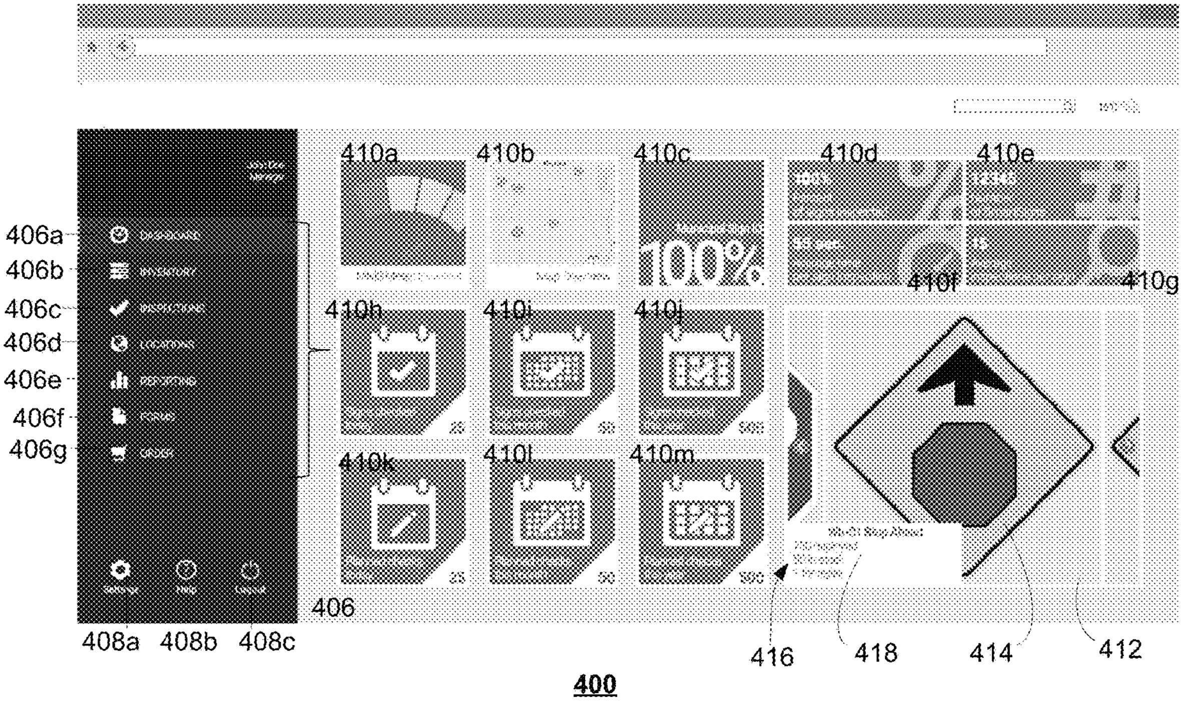
FIG. 7 shows an exemplary user interface.

FIG. 7 shows exemplary user interface 400 on user device 214*a* or 214*b*, such as a web-based interface which allows inputting, editing, outputting of the sign information, and administration of the compliance system. For example, user interface 400 is accessible to authorized users, and the authorized users may have different user-access privileges and associated actions that they may perform on the system. User interface 400 may presented via a web browser client, such as Microsoft Internet Explorer or Firefox, or client software other than a web browser. Web browser client may include functional control module, which controls user interface 400. An example of a functional control module is a Java applet, which is downloaded when the user accesses the web page for the host application having user interface 400.

Exemplary user interface 400 comprises two frame portions 402, 404. Frame 402 is configured to include a plurality of tabs 406, each of which, when selected invokes a display of icons associated with tabs 406 in portion 404. There may be some redundancy of information or functionality between screens corresponding to the different tabs 406, but each tab 406 is associated with a particular application module 237 and to display at least some information or functionality that is not found in any other single tab 406. Exemplary modules include dashboard module 237, inventory module 237, inspection module 237, location module 237, compliance reporting module 237, forms module 237, and order module 237. Any of tabs 406 may be selected and include "Dashboard" tab 406*a*, "Inventory" tab 406*b*, "Inspections" tab 406*c*, "Locations" tab 406*d*, "Reporting" tab 406*e*, "Forms" tab 406*f* and "Order" tab 406*g*. As an example, actuating "Dashboard" tab 406*a* displays a menu or collection of icons 410 in portion 404. A compliance reporting module 237 compiles a field report including the contemporaneous condition of signs 10, following actuation of "Reporting" tab 406*e*.

Menu 410 therefore includes icons representing associated applications, services, or widgets available to the user. By way of example, upon touching an icon, a new interface is presented in portion 404 to provide access to the corresponding application. A user may then close the subsequent interface via, by way of example and not by way of limitation, a subsequent touch to a specified "close" button thereby returning to the previous menu 410. Frame portion 402 also includes "Settings" icon 408*a* for user configuration, "Help" icon 408*b* and "Logout" icon 408*c*.

Exemplary applications or services available upon actuating "Dashboard" tab 406*a* may include metering and statistical applications or services related to compliance rates accessible by selecting MMS meter icon 410*a*. As another example, mapping and location applications or services for display of signs within a chosen geographical area may be accessible by selecting "Map" icon 410*b*. The overall knowledge of the signs within a chosen municipality or geographical region is displayed by "Municipal Sign IQ" icon 410*c*, and selection displays the underlying data. Selecting any of the "Summary" icons 410*d*, 410*e*, 410*f*, and 410*g* displays summaries related to sign inspections, number of managed signs, sign inspection duration, and sign inspection rates. Immediate statistics related to sign maintenance are available via scheduling and maintenance icons 410*h*, 410*i*, 410*j*, 410*k*, 410*l*, and 410*m*. For example, icon 410*h* shows the number of signs inspected on a particular day, while icon 410*i* displays the number of signs inspected or checked within a particular time period, such as a month, and icon 410*j* displays the number of signs inspected within a particular year. Other icons 410*k*, 410*l*, and 410*m* display the number of scheduled inspections for a particular day, month and year, respectively. Selecting any of icons 410*h*, 410*i*, 410*j*, 410*k*, 410*l*, and 410*m* displays the underlying data, such as details of the actual signs that were inspected or scheduled to be checked. Portion 406 also includes a persistent window 412 displaying a plurality of scrollable images 414 of signs. For each displayed sign, details 416 such as the description of the sign, the deployed quantity of that sign, inventory levels of that sign and quantity of that sign scheduled for repair, are also displayed in an overlay window 418.

Figure 8:
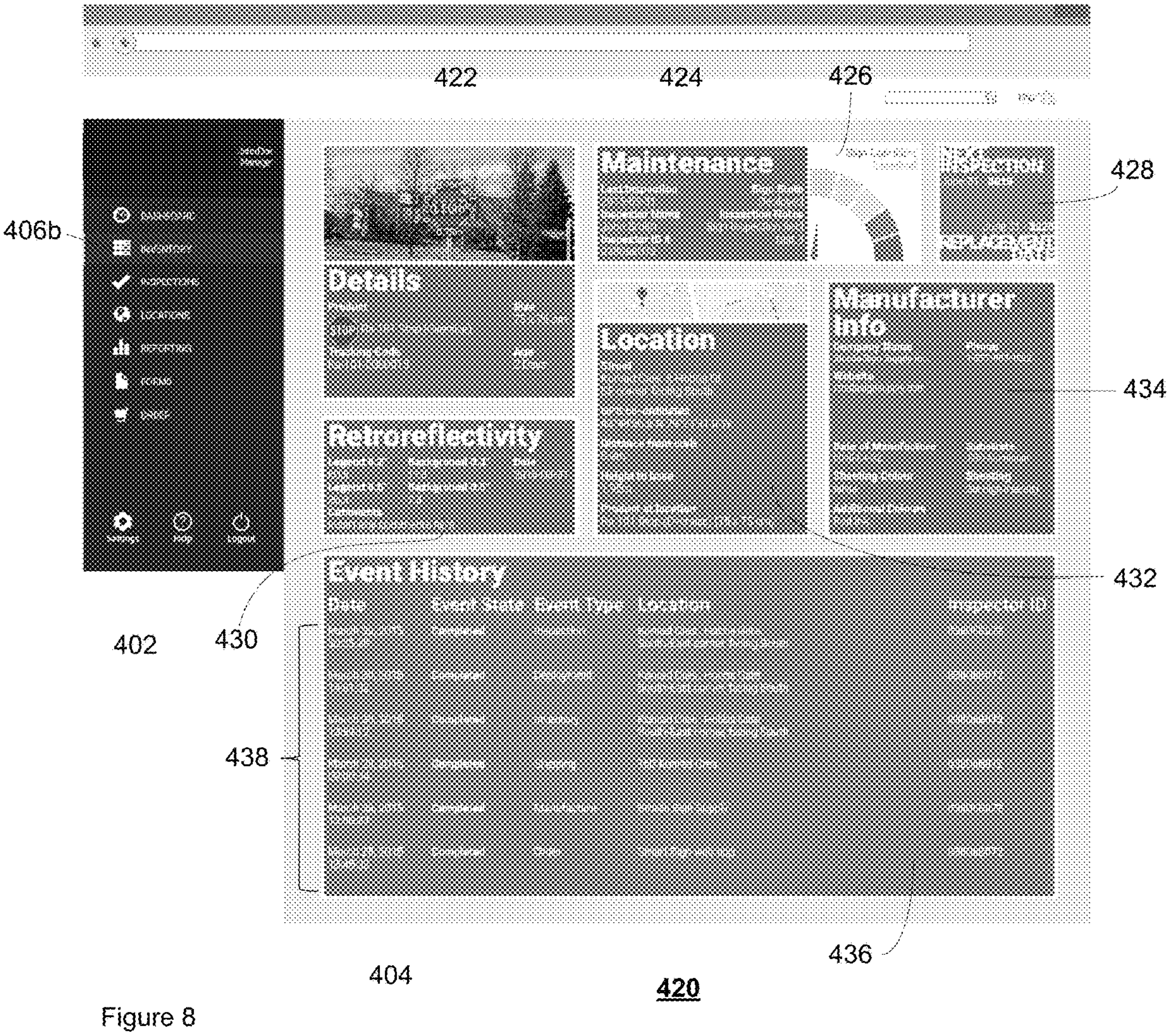
FIG. 8 shows another exemplary user interface.

Now turning to FIG. 8, there is shown in portion 404 a display 420 with a plurality of content items related to a particular selected sign, following selection of "Inventory" tab 406*b*. For example, selection of stop sign results is displayed in a "Details" content window 422, which includes an actual image of the installed sign in situ, dimensions of the sign, product details and the sign ID associated with the tag ID. Another content window 424 displays the maintenance data related to the selected sign, such as date of last maintenance or inspection, inspection personnel details, inspection identifier (ID), sign state and inspection notes. The condition of the selected sign is displayed in content window 426, and may include a colour-coded scale ranging from "poor" to "good". Content window 428 shows details related to the next scheduled inspection and a replacement date for the selected sign. Details pertaining to the retroreflectivity of the selected sign are displayed in content window 430. The geographical location of the selected sign is displayed in content window 432, and may include the street on which the selected sign is installed, GPS coordinates, distance from the curb, and so forth. Content window 434 shows manufacturer information, such as contact details, date of manufacture, sheeting characteristics, sheeting colour, substrate, and so forth. Event history content window 436 displays event details 438 pertaining to manufacturing, ordering, shipping, inventory, deployment and inspection. Each event is associated with a status designation (e.g., scheduled, in-progress, on-hold, and completed), location and a personnel identifier.

Figure 9:
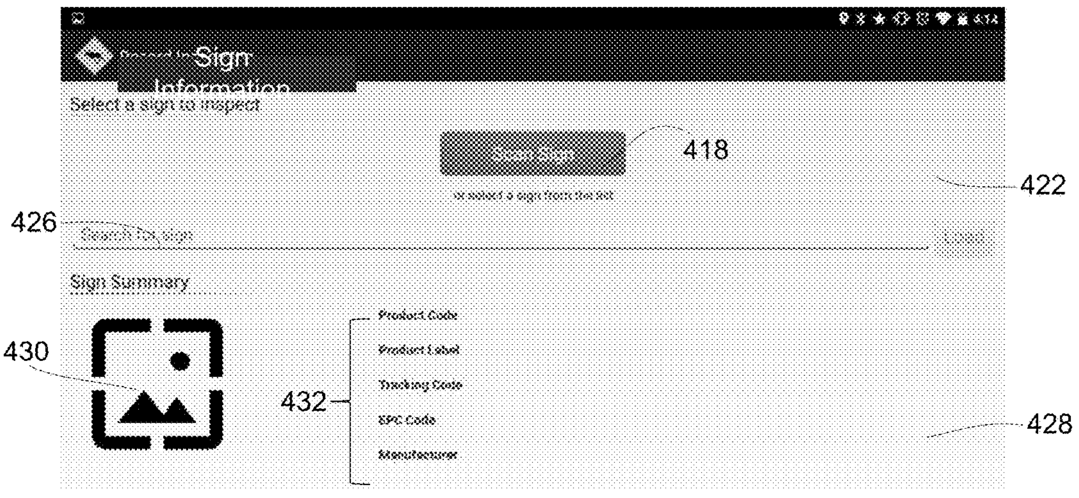
FIG. 9 shows another exemplary user interface.

FIG. 9 shows exemplary screen 440 with one portion 442 of screen 440 having "Scan Sign" button 444 which allows a user to scan a sign during an inspection, following selection of "Inspections" tab 406*c* in FIG. 7. Alternatively, a particular sign may be selected from a list of signs via a drop-down menu, or a search for a particular sign may be performed via query field 446. Once the sign is scanned or selected, a summary 448 of the sign is displayed in another portion 450 of screen 420. For example, the summary 448 may include image 452 corresponding to selected or scanned sign, and also includes sign information 454 related to the product code, product label, tracking code, EPC Code and manufacturer of the sign.

Figure 10:
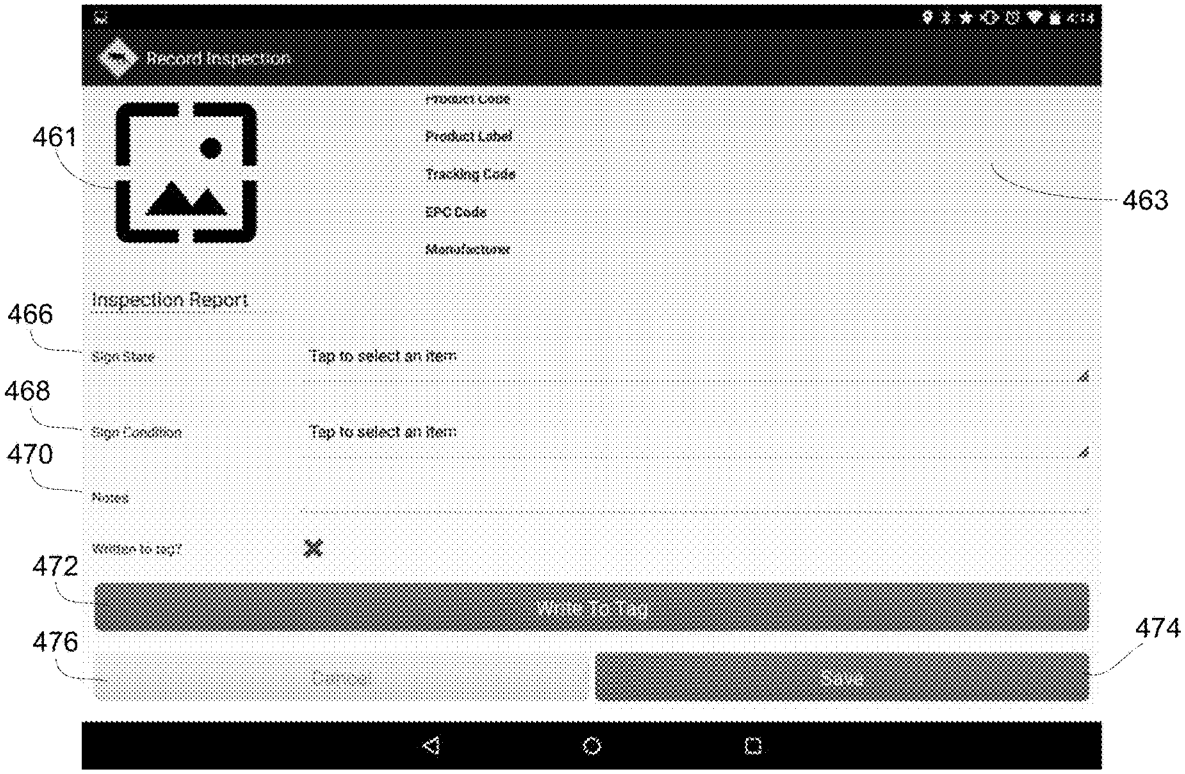
FIG. 10 shows another exemplary user interface.

Following an inspection, details of the inspection may be recorded via an exemplary screen 460, as shown in FIG. 10. An image 461 of the sign and summary 462 of the sign is displayed in portion 463 of screen 460. Portion 464 of screen 460 includes various data fields such as sign state 466, sign condition 468, and notes 470. Accordingly, a user may input or input data related to the state of the sign, its condition and any notes or observations related to the sign. Once data fields 466, 468 and 470 have been populated, a user may write the inputted data to the RFID tag associated with the sign by actuating "Write to Tag" button 472, and "Save" button 474 or forego recordal of the inspection by actuating "Cancel" button 476.

Figure 11:
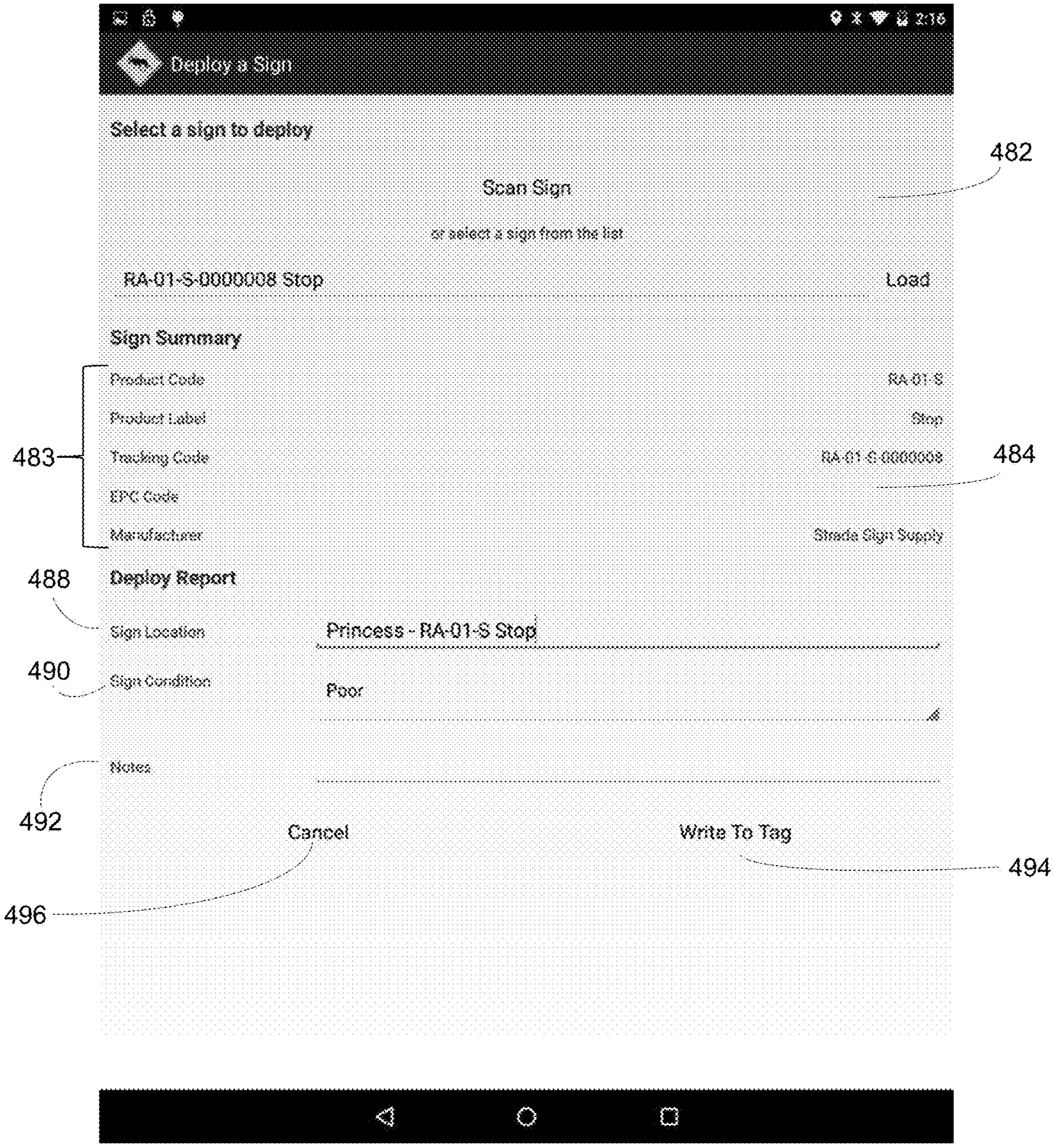
FIG. 11 shows yet another exemplary user interface.

In another embodiment, frame portion 402 includes a "Deploy Sign" tab which advances a user to an exemplary screen 480, as shown in FIG. 11, which allows a user to perform a general scan, or read, of a sign to be deployed in the field, in portion 482 of screen 480. A summary 483 of the sign is displayed in another portion 484 of screen 480. Portion 486 of screen 480 includes various data fields such as sign location 488, sign condition 490, and notes 492. Accordingly, a user may input data related to the geographical location of the sign, its condition and any notes or observations related to the sign. Once data fields 488, 490 and 492 has been populated, a user may write the inputted data to tag 203*a* associated with the sign by actuating "Write to Tag" button 494, and "Save" button (not shown) or forego deployment by actuating "Cancel" button 496.

User interface 400 may include a communication toolbar that enables a user to communicate via multiple types of communication channels, such as e-mail, telephone, facsimile, and wireless messaging. Furthermore, user interface 400 may be configured to include, for example, "Previous" and "Next" buttons (not shown) to enable navigation, or view records related to the signs, users, and so forth. In addition, using web interface 400, user can define a plurality of queries based on specific attribute criteria. Commonly executed queries can be saved and loaded to a user's profile. For example, users can query the inventory to identify signs that are nearing expiration and should be replaced. A missing asset report may also be generated, which shows all signs that system 200 has not received tag reads for, for a specified period of time.

In addition, alerts may be automatically outputted based on user-defined criteria.

In yet another exemplary embodiment, sign 202*a*, 202*b*, or 202*c* includes a printed circuit board (PCB) comprising processing and control module having processing circuitry, such as, microprocessor, which is arranged to communicate, via system bus, with memory. The skilled person will appreciate that memory may be provided by a variety of components including a volatile memory, a hard drive, a non-volatile memory, etc. Indeed, memory comprise a plurality of components under the control of the, or otherwise connected to, the processor. However, typically memory provides a program storage portion arranged to store program code which when executed performs an action, and a data storage portion which can be used to store data either temporarily and/or permanently. The PCB also includes a communications interface module with a transceiver for emitting radio signals, and for receiving radio signals from other signs sign 202*a*, 202*b*, and 202*c*, as will be described in more detail below. Communications interface module may include a wired interface, wireless interface, optical, IR interface or RF interface, and may use standard protocols such as SONET, SDH, Zigbee, Ethernet, Wi-Fi (e.g. IEEE 802.11a/b/g/n, WiMax), Bluetooth, powerline communication (e.g. IEEE 1901), GSM/GPRS, IS-41 (CDMA, TDMA, AMPS) or other standard and non-standard physical layers well known to those skilled in the art. In addition, communications interface module enables connection to shared or remote drives, one or more networked computers 206, or other networked devices 214*a*, 214*b*, via communications network 210. PCB also includes a power unit which receives direct current (DC) electrical power e.g., batteries, and/or alternating current (AC) electrical power.

In one embodiment, sign 202*a*, 202*b*, or 202*c* is associated with photovoltaic (PV) system coupled to the power unit. PV cells may be incorporated with the sign, such as on the face of the sign 202*a*, 202*b*, or 202*c*, or the rear of the sign 202*a*, 202*b*, or 202*c*. Alternatively, the PV cells are positioned such that the signage is not blocked, such as above sign 202*a*, 202*b*, or 202*c*, or besides the sign 202*a*, 202*b*, or 202*c*, or on the post type (e.g. building, fence, gate, I-beam, light pole, overpass, round, signal mast, signal pole, square, u-channel, utility pole). Power unit may receive and manage power from a plurality of disparate systems, such as PV system, DC power and AC power.

In yet another embodiment, signs 202*a*, 202*b*, and 202*c* are network-enabled and are capable of transmitting data pertaining to the sign 202*a*, 202*b*, or 202*c* automatically, or at predetermined time periods to server computer 206. Alternatively, signs 202*a*, 202*b*, and 202*c* within a particular geographic area that are relatively proximate to each other, such as an intersection, can communicate with each other i.e. motes within a mesh network, and at least one of these signs 202*a*, 202*b*, and 202*c* includes a communications interface coupled to communications network 210, and acts as an access point. Accordingly, signs 202*a*, 202*b*, and 202*c* are able to communicate with each other to relay messages to each other and provide status of each mote, and the recorded data is transmitted to server computer 206 of compliance management unit 208.

In yet another embodiment, sign 202*a*, 202*b*, or 202*c* includes a GPS circuit having at least one GPS sensor for determining location of sign 202*a*, 202*b*, or 202*c*, and the GPS data is transmitted to server computer 206 via communication network 210 for use in mapping, planning, maintenance and monitoring applications, as well as asset recovery.

In yet another embodiment, sign 202*a*, 202*b*, or 202*c* includes an acceleration sensor circuit having at least one acceleration sensor or accelerometer for detecting the acceleration of sign 202*a*, 202*b*, or 202*c* in the event of an accident, severe weather e.g. hurricanes, or tornadoes, theft or vandalism. The sensed data is transmitted to server computer 206 via communication network 210.

In yet another embodiment, sign 202*a*, 202*b*, or 202*c* includes a gyroscopic sensor circuit having at least one sensor to provide real time updates of the orientation of sign 202*a*, 202*b*, or 202*c* based on a plurality of axes. For example, the memory on the PCB comprises threshold values (e.g. high and/or low) for a plurality of orientation angles, and the processor executes instructions to compare the sensed values to the stored threshold values, and when the sensed values exceed the stored values (or outside a prescribed range), then an action is taken, such as an alert or notification to the server computer 206. As an example, the alert or notification may include details of sign 202*a*, 202*b*, or 202*c*, such as identity, location, sensed values, and threshold values, among others, to trigger an appropriate action by a user. For example, if one sign 202*a*, 202*b*, or 202*c* experiences a force that causes it to tilt or fall down e.g., in the event of a vehicular accident or severe weather, then the sensed gyroscopic data is transmitted to server computer 206. Alternatively, when sign 202*a*, 202*b*, or 202*c* is configured to report its gyroscopic status, among others, and the sign 202*a*, 202*b*, or 202*c* fails to report into the network, and/or report the desired gyroscopic status, then an alert or notification is generated and sent to the responsible personnel.

In yet another embodiment, sign 202*a*, 202*b*, or 202*c* includes a speaker. For example, speaker is able to output commands, alerts, or confirmation during or following an inspection.

In another example, sign 202*a*, 202*b*, or 202*c*, such as a stop sign, may detect pedestrians approaching by interacting with their mobile devices, and issue a command to the traffic lights to stop traffic based on Bluetooth iBeacon™ technology, and also provide instructions for safe crossing in a default language set on their mobile devices. For example, if Person A's mobile device is set to "Hindi" language setting, and Person B's mobile device is set to "English" language setting, and Person C's mobile device is set to "French" language setting, the sign 202*a* will recognize that Person A, Person B, and Person C are all approaching and provide instructions in the respective languages either from an onboard speaker on sign 202*a*, or via the mobile device's speaker or headphones.

In yet another embodiment, sign 202*a*, 202*b*, or 202*c* includes a NFC tag for near-field communications with NFC-enabled devices to allow user interaction with the sign 202*a*, 202*b*, or 202*c*.

In yet another embodiment, sign 202*a*, 202*b*, or 202*c* comprises an integrated circuit (IC) chip comprises processing circuitry, memory for storing a unique identifier and/or unique sign identifier, and attribute data, and a communication interface similar to communication interface 228, such as a wireless communication interface with an associated antenna.

In yet another embodiment, sign 202*a*, 202*b*, or 202*c* includes an LCD/OLED/LED screen to display municipal maintenance data, the screen being positioned on the back face 16 of sign 202*a*, 202*b*, or 202*c*.

In yet another embodiment, the location data of signs 202*a*, 202*b*, and 202*c* or the Bluetooth iBeacon™ type technology can be used with software application addition for user device tracking. Currently, devices are tracked on three levels, onboard GPS, Wi-Fi maps, and cell tower triangulation. The use of signs 202*a*, 202*b*, and 202*c* presents yet another lower-level form that would establish the mesh network infrastructure necessary to provide constant connectivity in environments that poorly account for the previously mentioned locating methods. (i.e., underground tunnels, subways, bridges, channels, indoors. Accordingly, any user device proximate to network-enabled sign 202*a*, 202*b*, or 202*c* in a mesh network can interface with sign 202*a*, 202*b*, or 202*c* via Bluetooth™, and the user device can therefore be located based on the positional data of sign 202*a*, 202*b*, or 202*c*. For example, traffic signs, way finding signs, informational signs, advertising signs, and other signs are typically deployed at a static location, and are therefore suitable for such an application.

In yet another exemplary embodiment, RFID tag 30 may be semi-active or active.

In yet another exemplary embodiment, substrate 12 may be non-metallic.

In yet another exemplary embodiment, recessed portion 20 with an opening 22 is formed on back face 16.

In yet another exemplary embodiment, recessed portion 20 with an opening 22 is formed in any of side edges 18*a-d*.

In yet another exemplary embodiment, in addition to traffic signs, and streetlights and traffic signals may also be managed.

Figure 12A:
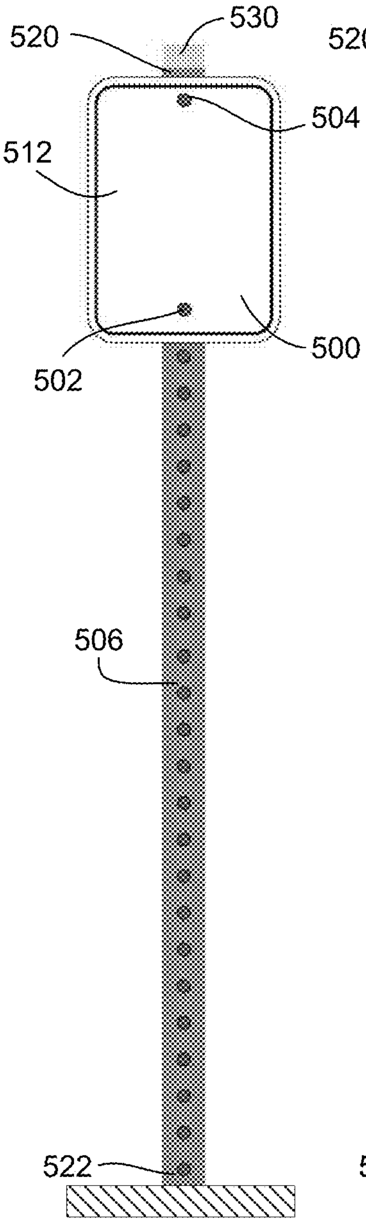
FIG. 12*a* shows a front view of a sign mounted on a sign post.
Figure 12B:
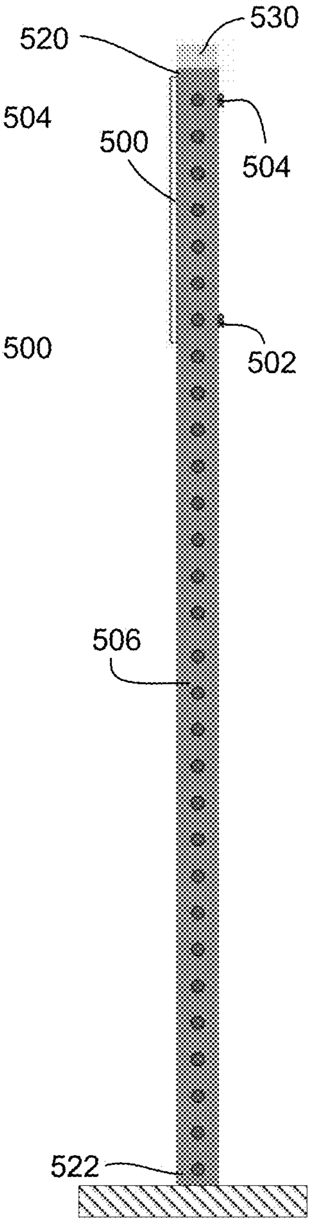
FIG. 12*b* shows a side view of the sign mounted on the sign post.
Figure 12C:
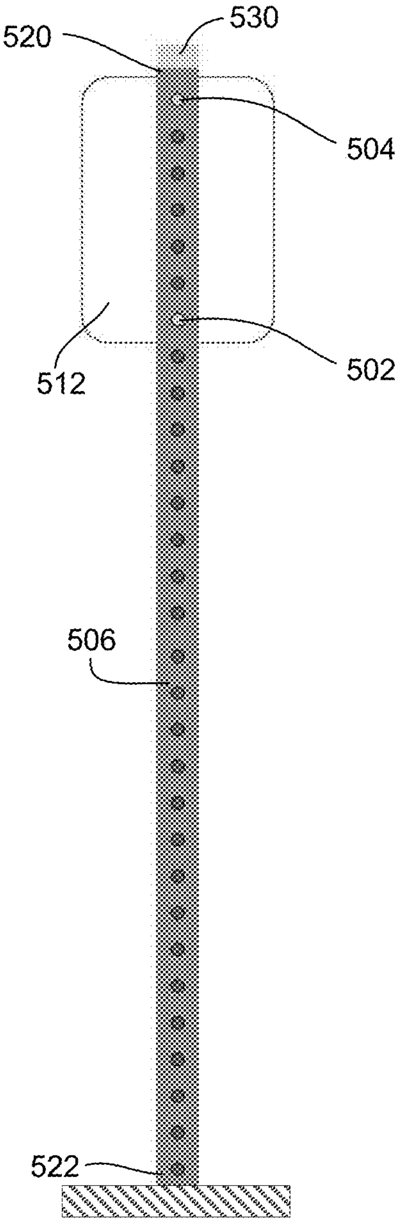
FIG. 12*c* shows a rear view of the sign mounted on the sign post.

In yet another embodiment, FIGS. 12*a-c* show views of an exemplary road sign, generally identified by reference numeral 500. Sign 500 comprises a substrate made from properly prepared metallic blanks, such as aluminum, for desired adhesion and sign durability, support for fastening means 502, 504, such as screws, rivets, nuts and bolts for affixing to a post 506 or surface. The substrate includes opposing planar faces 510 and 512, that is, sign face 510 and back face 512, having peripheral side edges. Sign face 510 of the substrate is chemically cleaned and etched or mechanically abraded in accordance with American Society for Testing and Materials (ASTM) standards, or equivalent guidelines from other standard issuing bodies. The back face 512 is rendered dull and non-reflective either by mechanical or chemical means. Similar to sign 10, the substrate may comprise a plurality of shapes dependent of the message sign 10 is to impart, for example, a rectangular shaped substrate is commonly employed for information signage, while an octagonal shaped substrate is associated with a primary traffic symbol. The metallic blanks may be made from aluminum or zinc/aluminium alloy coated structural steel, among others.

Support member 506 is hollow and includes a top opening 523 with a recess 524 defined therein by an inner surface 526 of support member 506. Recess 524 has a generally square cross-sectional shape. Alternatively, recess 524 is defined by a variety of other shapes, including, but not limited to, rectangular, circular, or triangular shapes. In another example, support member 506 is a U-channel post, a T-channel post, a round post, or a solid non-hollow post, I-beam, light pole, overpass, signal mast, signal pole, or utility pole.

Figure 13A:
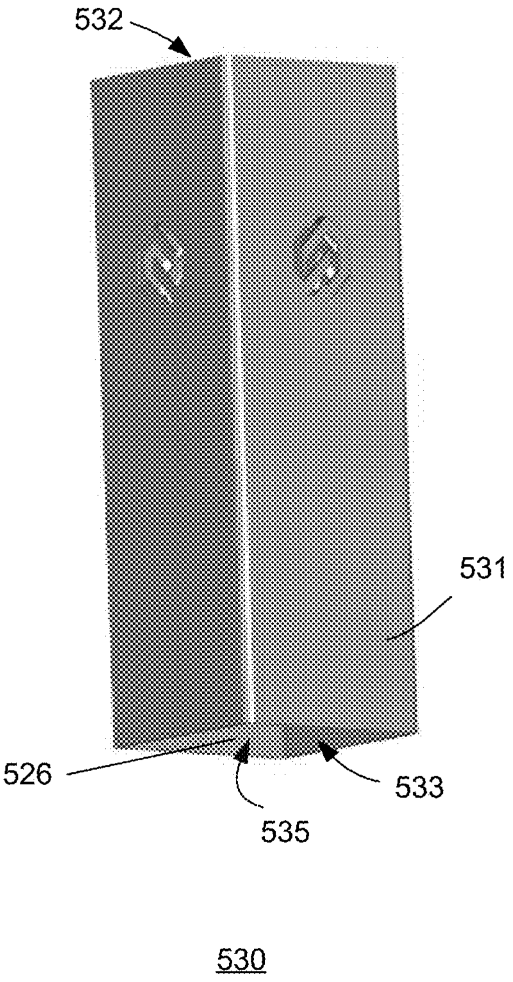
FIGS. 13*a-c* show different isometric views of the sign post.
Figure 13B:
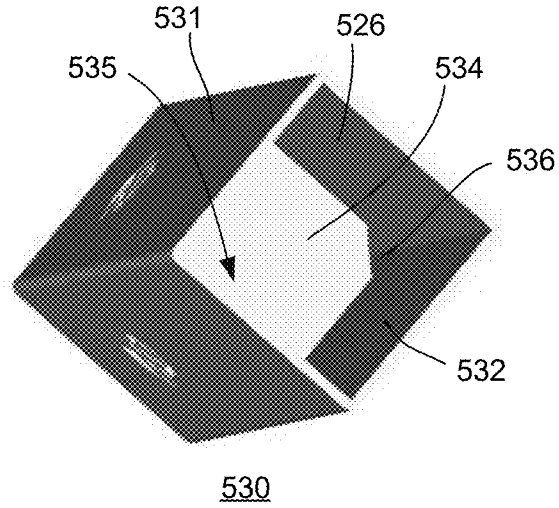
Figure 13C:
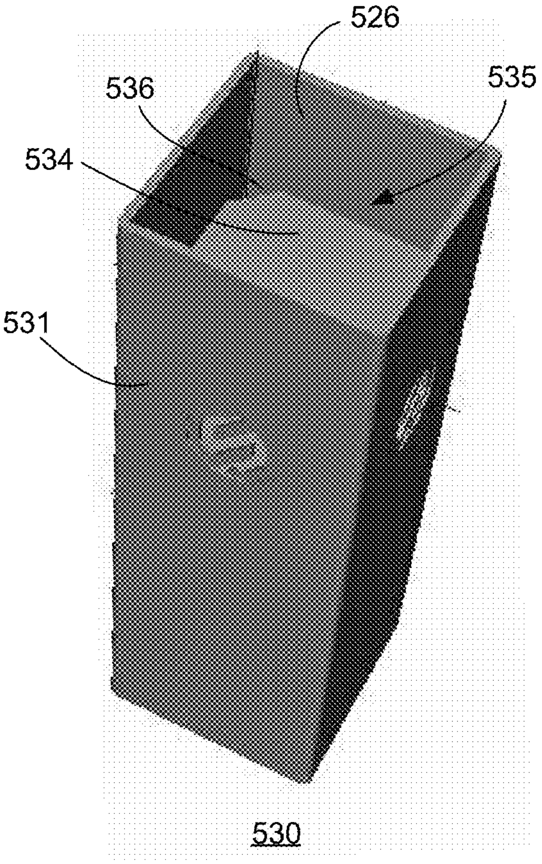

Now turning to FIGS. 13*a-c*, there is shown module enclosure 530 which is telescopically received by top opening 523 of the longitudinal hollow support member 506. The module enclosure 530 houses components of a compliance module, and comprises hollow member 531 with top opening 532 and bottom opening 533. Seat 534 is secured within recess 535, and edges of seat 534 abut the inner surface 526 and having one corner cut out such that gap 536 is defined between the seat 532 and the inner surface 526.

Figure 14A:
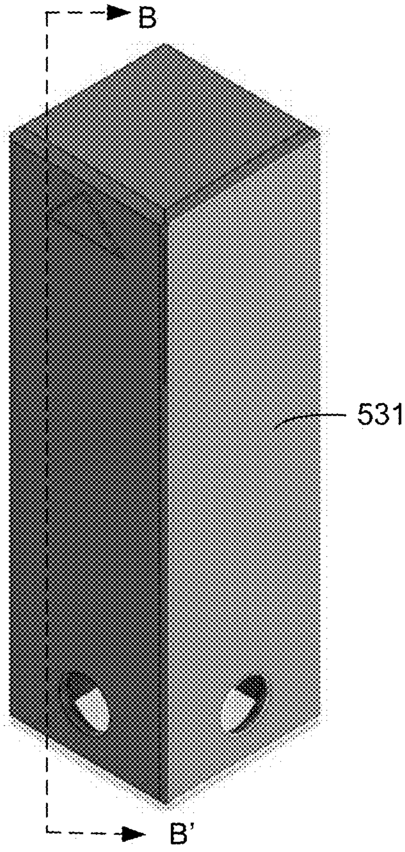
FIG. 14*a* shows an isometric view of a module enclosure.
Figure 14B:
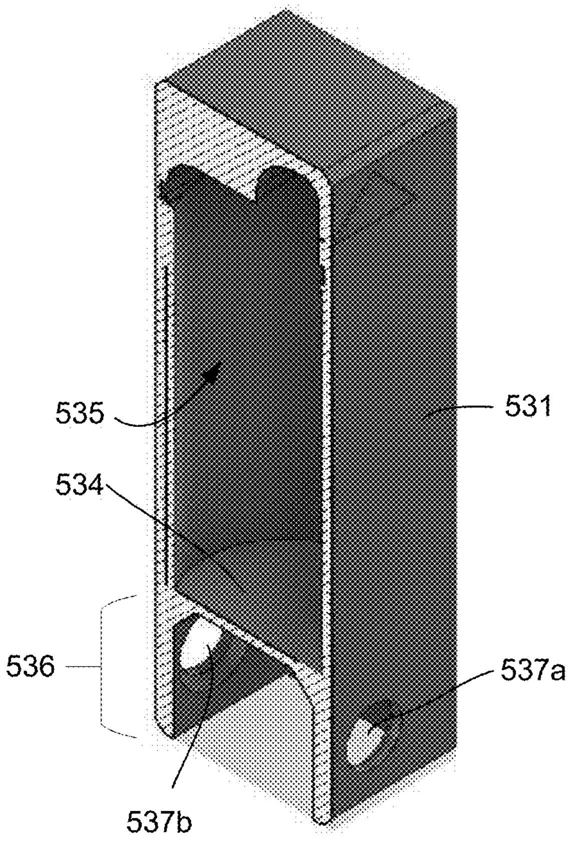
FIG. 14*b* shows a sectional view of the module enclosure of FIG. 14*a* taken along line A-A'.
Figure 15A:
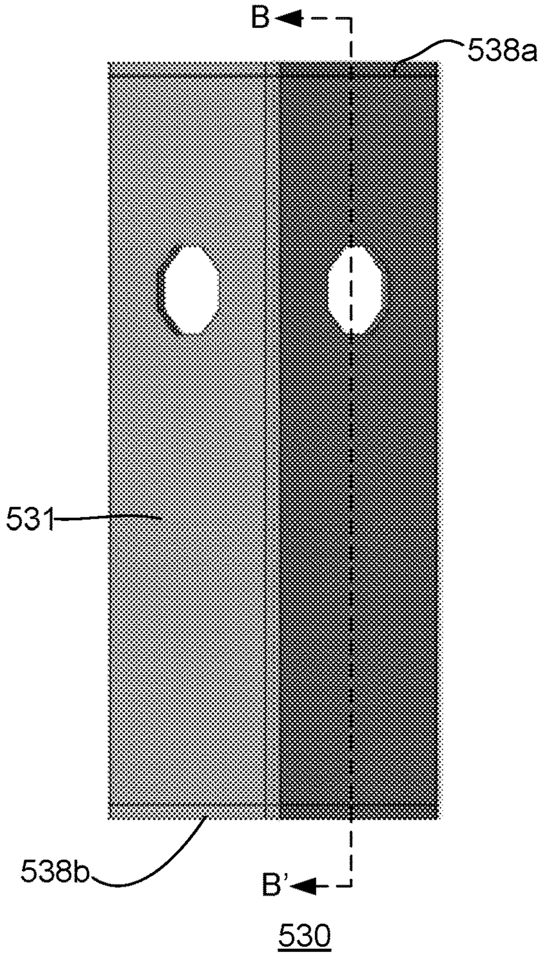
FIG. 15*a* shows an isometric view of a module enclosure.

FIG. 14*a* shows an isometric view of a module enclosure 530, in another example; and FIG. 14*b* shows a sectional view of the module enclosure of FIG. 15*a* taken along line A-A'. The module enclosure 530 may be a single piece component, and includes an enclosed compartment 535, with seat 534, which houses components of a compliance module 539, and mounting section 536 with mounting holes 537*a*, 537*b* for mounting the module enclosure 530 on to the support member 506. In one example, the module enclosure 530 is mounted on top of the support member 506 by via fastening means. For example, fastening means may include a bolt that is introduced through the holes 537*a*, 537*b* and holes in the support member 506.

Figure 15B:
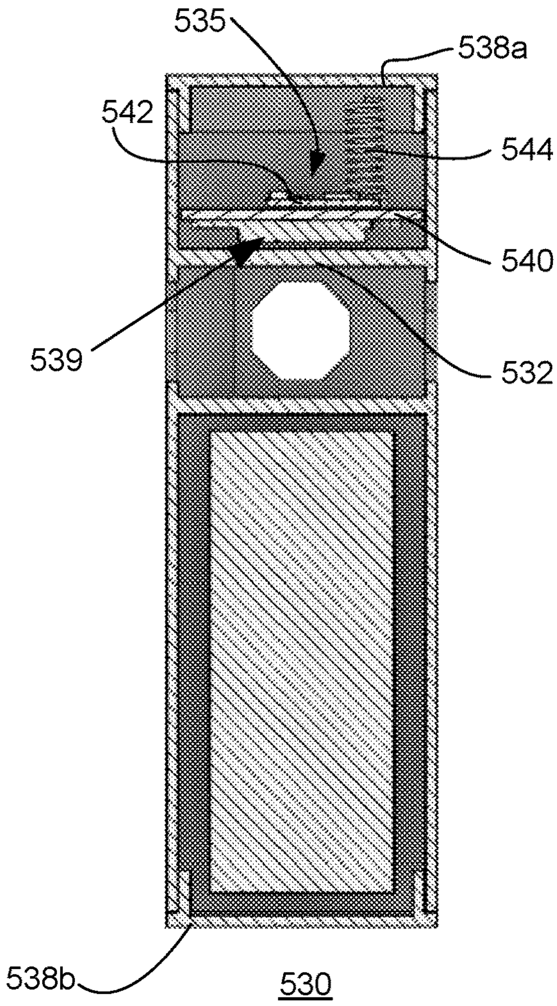
FIG. 15*b* shows a sectional view of the module enclosure of FIG. 15*a* taken along line B-B'.

Looking at FIG. 15*a*, caps 538*a*, 538*b* are received by top opening 532 and bottom opening 533 of module enclosure 530, respectively. As shown in FIG. 15*b*, module enclosure 530 houses compliance module, or radio node device, 539, such as an IoT device, configured to report on the status and condition of deployed regulatory road sign assets 202*a-c* and supporting post structures 506, and to ensure that the traffic road sign assets 202*a-c* are still capable of communicating safety messaging clearly to vehicle operators and pedestrians.

Figure 15C:
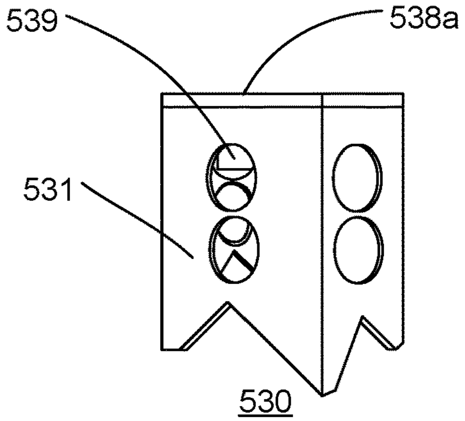
FIG. 15*c* shows a perspective view of a module enclosure, in another example.

Compliance module 539 includes a printed circuit board (PCB) 540 and an antenna 544 is received within the recess 524, and is secured to the seat 532. The gap 536 allows for water or snowmelt runoff within the hollow member 531, thereby avoid contact of water or snowmelt, or accumulation thereof, with the circuitry of PCB 540. In one example, PCB 540 is conformally coated to withstand exposure to elements, all PCBs 540 are 4-layer boards to accommodate antenna ground plane. FIG. 15*c* shows a module enclosure 530 which is telescopically received by top opening 523 of the longitudinal hollow support member 506, in another example.

Figure 15D:
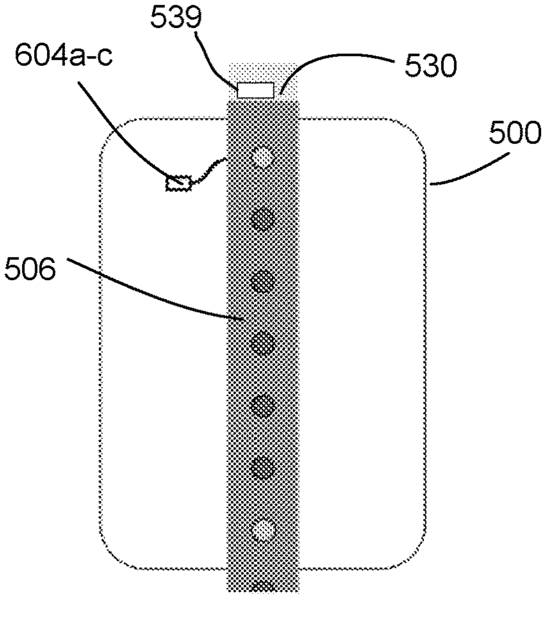
FIG. 15*d* shows a back face of the sign including sensors.

In one example, back face 512 of the sign 500 includes sensors 604*a-c*, as shown in FIG. 15*d*. However, sensors 604*a-c* may be secured to sign post 506, or may be included with PCB 540 within recess 535.

Figure 16:
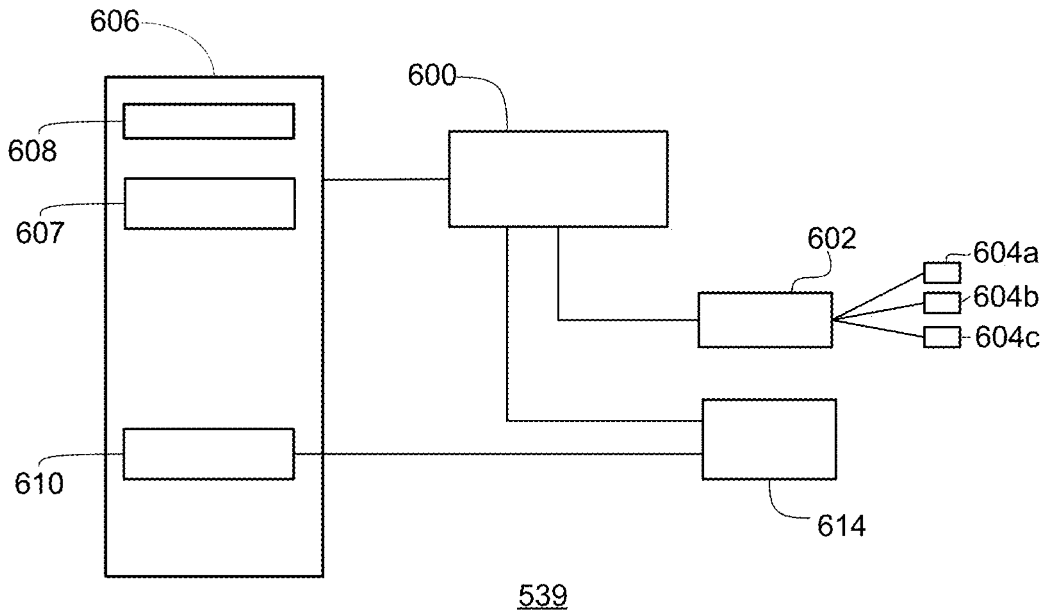
FIG. 16 shows an exemplary circuitry of a device within the module enclosure.

As shown in FIG. 16, PCB 540 may include circuitry 542 comprising a microprocessor, a microcontroller unit (MCU), a small-board computer, or system on a chip (SoC) 600, such as, ESP 32 module, a low-power system on a chip microcontrollers with integrated Wi-Fi and dual-mode Bluetooth, manufactured by Espressif Systems, China), or other suitable processing device.

The printed circuit board 540 comprises one or more sensor controllers 602, which control one or more sensor devices 604*a-c* for acquiring measurements associated with the sign 500 and sign post 506 or ambient environmental conditions in the vicinity of the sign 500 and sign post 506. The sensor devices 604*a-c* may include microphones, cameras, ambient light sensors, pressure sensors, voltage sensors, environmental sensors, temperature sensors, accelerometers, GPS sensors, and so forth.

In one example, power controller 606 includes a synchronous buck-boost converter 607 which produces a range of output voltages for the PCB 540, battery 608, electrostatic double-layer capacitors (EDLCs) for multiple rapid charge/discharge cycles or hybrid layer capacitors 610.

Radio node device 539 comprises RF transceiver module 614. In one example, radio node device 539 uses a RFM95/96 module, manufactured by Hope Microelectronics Co., Ltd., Shenzhen, China, operating in the 915 MHz North American ISM band that makes use of SEMTECH SX1276 LORA transceiver, manufactured by Semtech Corporation, France. LoRa wireless technology allows transmitting data over extremely long ranges at low data-rates, and provides ultra-long range spread spectrum communication and high interference immunity whilst minimizing current consumption. RF transceiver module 614 further comprises a system-in-package inertial measurement unit (IMU) 602, such as LSM303, featuring a 3D digital linear acceleration sensor and a 3D digital magnetic sensor, with six degrees of freedom (6-DOF). A low quiescent current buck SMPS 607, such as TPS63900, may be used to supply current to the RF transceiver module 614.

The MCU and IMU may be powered directly from the LiSOCL2 608 domain due to low current requirements. EDLC super-capacitor 610 may be used to accommodate the pulsed current from the LORA module 614. The architecture shown in FIG. 16 can accommodate LiSoCL2 battery 608 with pulsed current outputs less than 150 mA. The LSM303 602 may be interfaced in serial peripheral interface (SPI) mode by leveraging both SPI busses of the ESP32 module 600, which allows the use of both peripherals independently.

A helical antenna or a straight whip antenna may be used on the LORA module 614 side via a vertically mounted SMA connector. The module 614 includes castellated pads which expedite development, and removes the need to implement an RF matching network on the PCB 540.

In one example, a star-of-stars topology is employed. In one example, the link budget is only applicable for single hopping between network nodes 539 and gateway 702.

Figure 17:
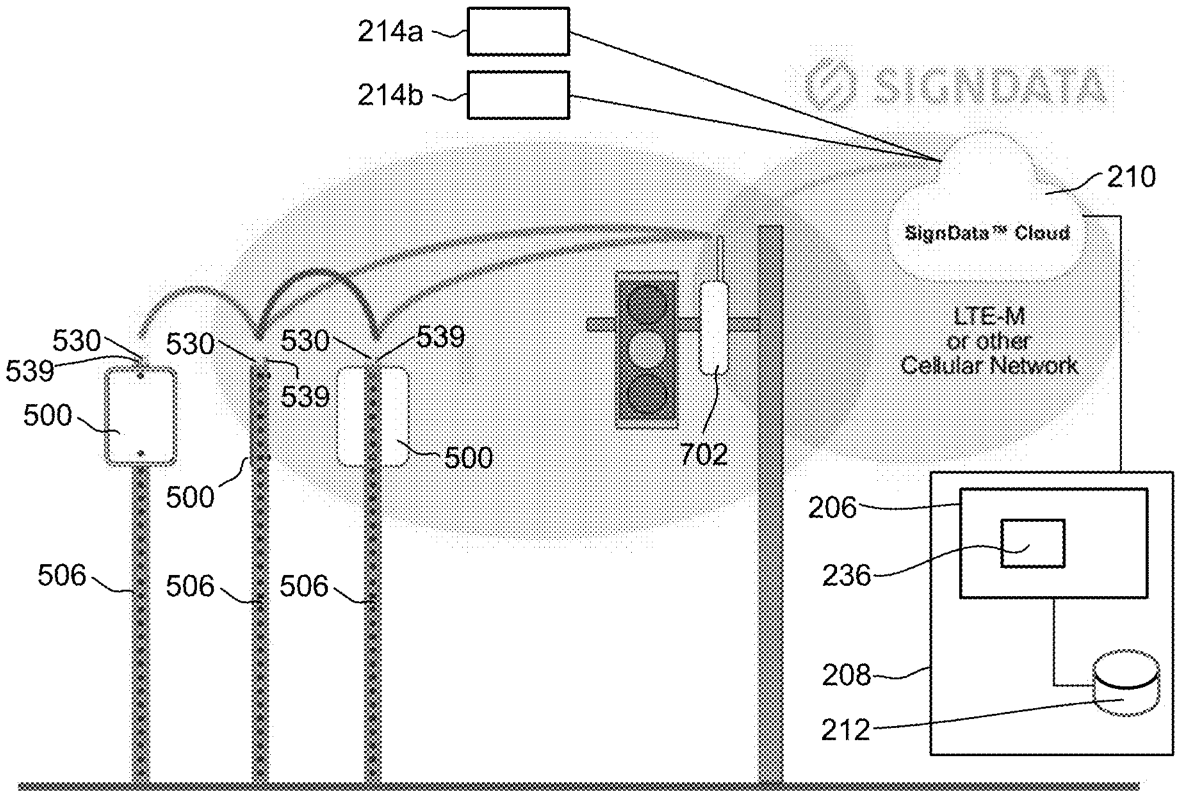
FIG. 17 shows a post module in communication with an access point coupled to a network.

As shown in FIG. 17, a plurality of nodes 539 contained in module enclosures 530, are wirelessly coupled to one or more in communication with network 210 via gateway device 702. The nodes 539 may include small cells (e.g., low-power radio access nodes with ranges between roughly 10 m and 1-2 km, including, but not limited to, femtocells, picocells, and microcells), macrocells (e.g., nodes 539 with ranges of up to a few tens of kilometers), etc. In one example, the nodes 539 may communicate with each other via a mesh network, which is self-healing, and at least one of the nodes 539 includes a communications interface coupled to the communications network 210, and acts as an access point. In one example, the nodes 539 communicate with each other, such that data is transmitted from one radio node device 539 through hopping to another radio node device 539 until one radio node device 539 transmits to the gateway 702 communicatively coupled to the coupled to the communications network 210, and vice versa.

In some embodiments, communication modules 612 connect to the wireless access point one or more nodes 539 using a suitable wireless adapter, including, without limitation, a Wi-Fi or WiMAX adapter. The sensor data from sensor 604*a-c* is transmitted to computing system 206 of a sign compliance management unit 208 via nodes 539 and communications network 210, such as a cellular network, LTE-M, 5G, Internet, and/or any other suitable network. Examples of computing system 206 may include, but are not limited to: a personal computer, a server computer, a series of server computers, a mini computer, and a mainframe computer. For example, server computer 206 comprises one or more databases 212, which may be any type of data repository or combination of data repositories, which store records or other representations of data. Accordingly, sign data and/or sensor data is stored on databases 212 and accessible to user devices 214*a*, 214*b* via server computer 206. Databases 212 may also include information pertaining to inspection programs (day and night), reflectivity tests, quality control, and warehouse and field inventories, maintenance/inspection history, such that each road sign 500 and sign posts 506 may be tracked.

In another example, an unmanned aerial vehicle (UAV) having an image acquisition device is employed for inspecting signs 202*a*, 202*b*, and 202*c*, 500 and includes a RFID/reader writer having features and functionalities, as described above. Accordingly, the UAV may be programmed to autonomously perform maintenance procedures, for example, the UAV may be provided with a list of GPS coordinates of signs 202*a*, 202*b*, and 202*c*, 500 for inspection and/or other actions to perform. The UAV may communicate with the compliance module 539 directly or via the gateway device 702, to receive measurements data, and other attribute data associated with the signs 202*a*, 202*b*, and 202*c*, 500 and sign post 506, for reporting to the sign compliance management unit 208. Alternatively, the UAV is remotely controlled by personnel at a central command center.

Figure 18:
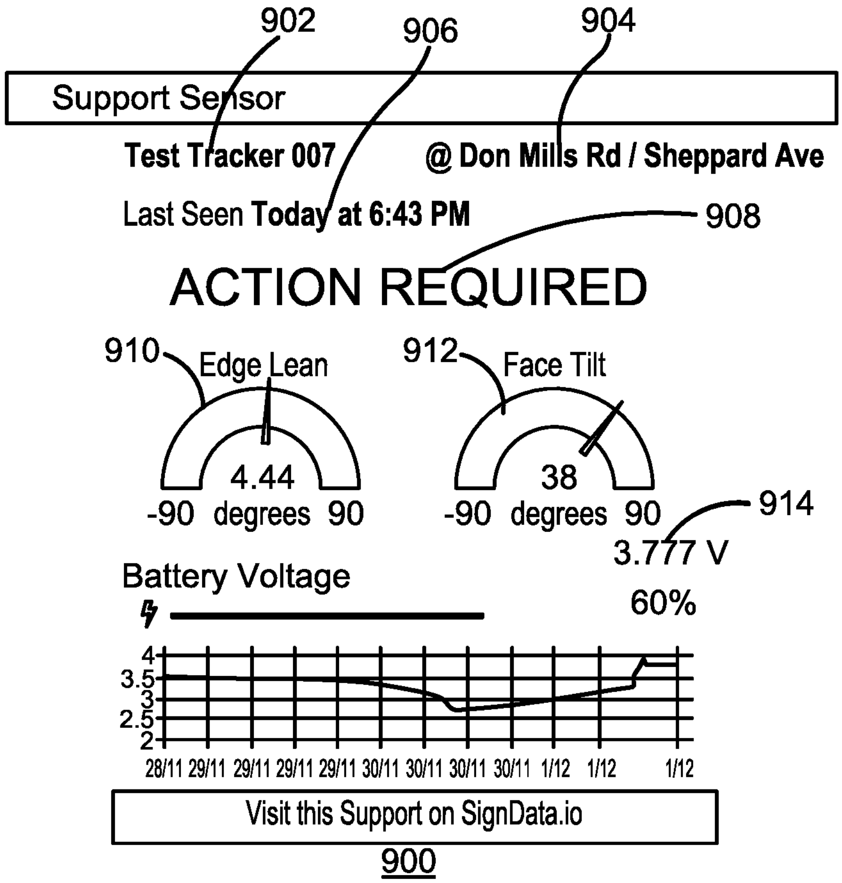
FIG. 18 shows an exemplary user interface for remedial action.

FIG. 18 shows an exemplary user interface 900 for remedial action. In one example, the user interface 900 comprises identification of the signage asset 902, location 904 of the asset 902, based on location data, such as that from the GPS sensor 906, radio access point, wireless access point, WIFI data, cell data, or installation data. The user interface 900 also includes a timestamp pertaining to the date and time of the alert, and an indication 908 for a remedial action to be taken based on predefined rules. Current status of the support member 506 and/or sign 500 is also displayed. For example, an indication as to whether the support member 506 is upright or positioned according to desired installation specifications is displayed on the user interface 900 by graphic 910, derived from measurements from the IMU and/or accelerometer. Graphic 912 indicates the degree the face 510 of the sign 500 is tilting, and the battery power statistics 914 are also displayed on the user interface 900.

Figure 19:
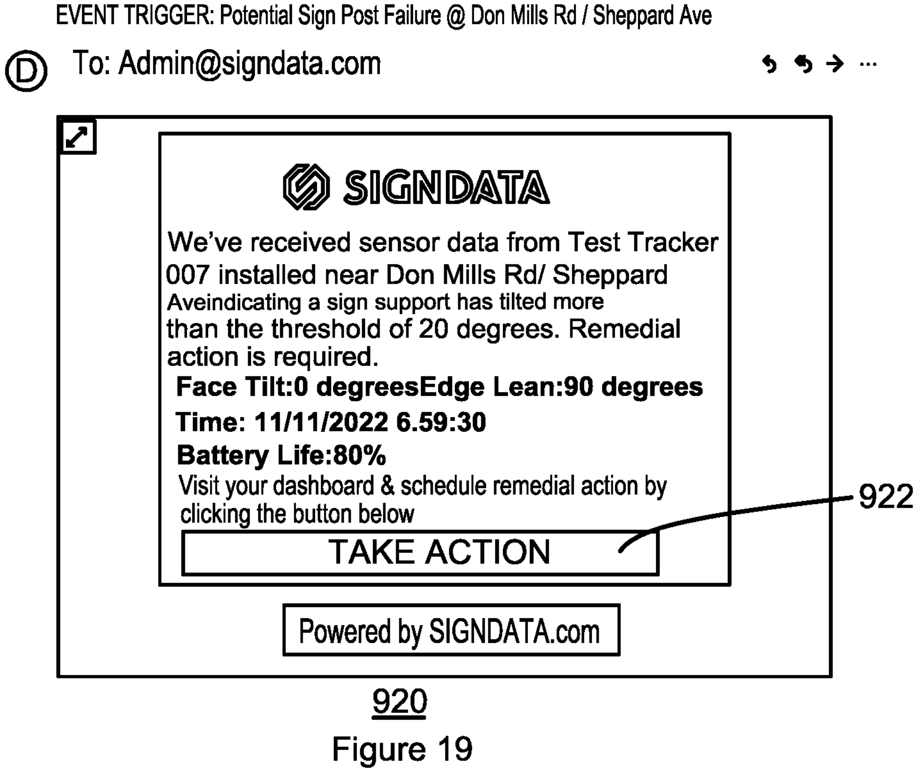
FIG. 19 shows an exemplary alert.

FIG. 19 shows an exemplary alert 920 in the form of an email message. The alert 920 includes details of the sensor data received from an identified asset, such as description of the sign 500 and/or sign post 506, asset identification information, orientation, sign face tilt (degrees), edge lean (degrees), location, a time stamp, and battery life details. The alert 920 also includes a button 922 imploring the user to take remedial action. The button 922 is associated with a hyperlink to a dashboard where the user can schedule for the appropriate remedial action to be taken.

Figure 20:
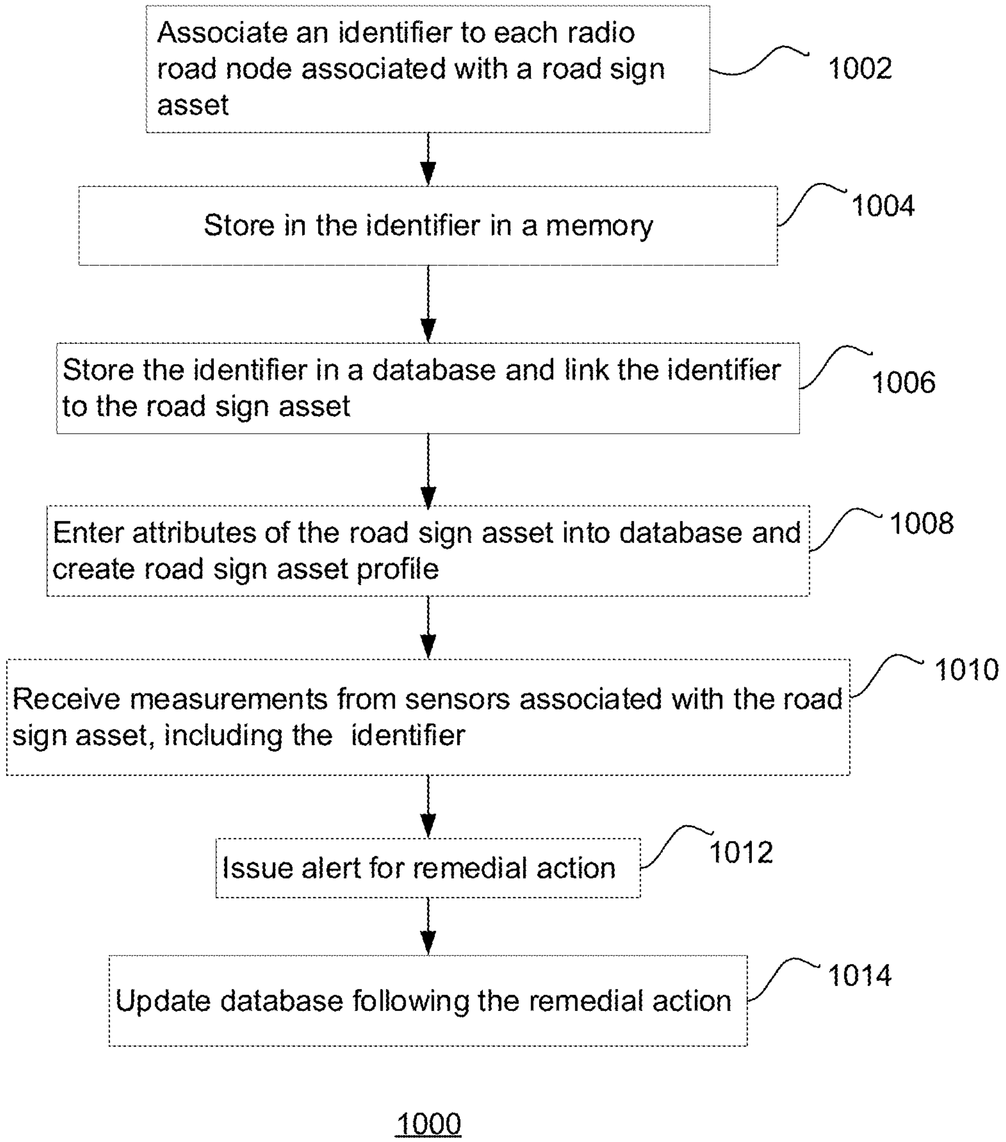
FIG. 20 illustrates an exemplary process for a tracking a road sign and a sign post.

FIG. 20 illustrates an exemplary process 1000 for tracking road sign 500 and sign posts 506 by sign compliance management unit 208. In step 1002, each radio node device 539 of each road sign 500 and/or sign post 506 is associated with a unique node identifier (node ID). The node ID may be stored within a memory device of the compliance module 539 (step 1004). In step 1006, the node ID is entered into database 212 and is relationally linked with to road sign 500 and/or sign post 506. Next, the attributes of road sign 500 and/or sign post 506 are entered into the database (step 1008), and may include any of, sign type, dimensions, substrate material, grade and manufacturer of reflective sheeting, location, jurisdiction (municipality, provincial, state, federal), Manual of Uniform Traffic Control Devices (MUTCD) Code, face direction (e.g. E, N, NE, NW, S, SE, SW, W), sign face condition assessment, inspection date, reason for critical rating, last inspection dates and results, recent maintenance events, next scheduled inspection/maintenance, among others, as stated previously.

The database 212 also include details associated with the sign post 506, such as, post type e.g. U-channel post, a T-channel post, a round post, or a solid non-hollow post, I-beam, light pole, overpass, signal mast, signal pole, or utility pole, including orientation, location, sign face tilt (degrees) and edge lean (degrees). As stated previously, the post 506 material (e.g. concrete, steel, wood, metal, plastic, other) may be specified, including the condition of the post (e.g. critical, fair, good). Other attributes may include: damage, graffiti, rusted, and twisted, leaning (degrees), missing, broken, among others.

Once the unique tag identifier or a unique sign identifier and attributes of each road sign 500 and/or sign post 506 are entered in database 212, road sign 500 and/or sign post 506 may be tracked and managed. Generally, device 539 is in a sleep state and periodically enters a wake state to initiate measurements from sensors 604*a-c*, and receive measurements from sensors 604*a-c*. In step 1010, device 539 reports the sensor measurements, including the identifier of each road sign 500 and/or sign post 506 to the sign compliance management unit 208. Based on predefined rules, the sign compliance management unit 208 issues an alert or an indication 908 for a remedial action to be undertaken, such as indication 908 shown on exemplary user interface 900 (step 1012). Once the appropriate action has been taken to remedy the situation, the database 212 is updated (step 1014).

In one example, the module enclosure 530 is mounted on the road sign 500.

In one example, the module enclosure 530 is mounted on top of the road sign 500.

In one example, the module enclosure 530 is mounted on top of a support member 506.

In one example, the module enclosure 530 is mounted adjacent a free end of the support member 506.

In yet another embodiment, for existing or legacy traffic signs 10, RFID assembly 30 is encapsulated within a case and secured to the legacy traffic signs to enable compliance tracking by system 200. Accordingly, the case protects RFID assembly from the environmental elements.

User device 214*a* or 214*b* may be a general-purpose computer system. The general-purpose computer system comprises, for example, a processing unit, such as processor, system memory. The system also includes as input/output (I/O) devices coupled to the processor via an I/O controller. The input/output (I/O) devices include, for example, a keyboard, mouse, trackball, microphone, touch screen, a printing device, display screen, speaker, etc. A communications interface device provides networking capabilities using Wi-Fi, and/or other suitable network format, to enable connection to shared or remote drives, one or more networked computers, or other networked devices, via the communications network 210. The components of computer system may be coupled by an interconnection mechanism, which may include one or more buses (e.g., between components that are integrated within a same machine) and/or a network (e.g., between components that reside on separate discrete machines). The interconnection mechanism enables communications (e.g., data, instructions) to be exchanged between system components.

The processor executes sequences of instructions contained in memory, such as a machine-readable medium. The machine-readable medium includes any mechanism that provides (i.e., stores and/or transmits) information in a form accessible by a machine (e.g., a computer, network device, personal digital assistant, a smartphone, any device with a set of one or more processors, etc.). For example, machine readable media includes recordable/non-recordable media (e.g., read only memory (ROM); random access memory (RAM); magnetic disk storage media; optical storage media; flash memory devices; a hard disk drive, etc.), as well as electrical, optical, acoustical or other forms of propagated signals (e.g., carrier waves, infrared signals, digital signals, etc.). The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used. The operating system may be, for example, iPhone OS (e.g. iOS), Windows Mobile, Google Android, Symbian, or the like.

Server computer 206 includes a computer system with elements similar to those described above with reference to user device 214*a* or 214*b*. Server computer 206 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

Server computer 206 may execute a web server application, examples of which may include but are not limited to: Microsoft IIS, Novell Webserver™, or Apache® Webserver, that allows for HTTP (i.e., HyperText Transfer Protocol) access to server computer 206 via network 210 (Webserver is a trademark of Novell Corporation in the United States, other countries, or both; and Apache is a registered trademark of Apache Software Foundation in the United States, other countries, or both). Network 210 may be connected to one or more secondary networks (e.g., network 210), examples of which may include but are not limited to: a local area network; a wide area network; or an intranet, for example.

Database 212 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention. Alternatively, database 212 is communicatively coupled to server computer 206.

The user devices 214*a*, 214*b* and computer server 206 may communicate with each other using network-enabled code. Network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMWL), Wireless Markup Language (WML), Java™, Java™ Beans, Enterprise Java™ Beans, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

The communications network 210 can include a series of network nodes (e.g., the clients and servers) that can be interconnected by network devices and wired and/or wireless communication lines (such as, public carrier lines, private lines, satellite lines, etc.) that enable the network nodes to communicate. The transfer of data between network nodes can be facilitated by network devices, such as routers, switches, multiplexers, bridges, gateways, etc., that can manipulate and/or route data from an originating node to a server node regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network.

One or more portions of the computer system may be distributed across one or more computer systems coupled to communications network 210. For example, various aspects of the computing system may be distributed among one or more computer systems (e.g., servers) configured to provide a service to one or more client computers, or to perform an overall task as part of a distributed system. For example, various aspects may be performed on a client-server, hybrid client-server, or multi-tier system that includes components distributed among one or more server systems that perform various functions according to various aspects.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized, and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

The invention claimed is:

1. A compliance management unit comprising:

a database for storing a record pertaining to attributes of at least one of a sign and a sign post, each of the at least one of the sign and the sign post having a unique identifier;

a non-transitory computer readable medium comprising instructions stored thereon and executable by a processing structure to cause said processing structure to at least:

determine at least one condition of the at least one of the sign and the sign post based on predetermined criteria and acquired measurements data associated with the at least one of the sign and the sign post; and establish a compliance risk assessment for the at least one of the sign and the sign post based on predefined rules, and generate a recommendation and/or action to be taken for compliance based on said compliance risk assessment.

2. The compliance management unit of claim 1, wherein the sign post comprises a support member;

the sign having a planar sign face and an opposing planar back face, wherein the sign is affixed to the support member;

a compliance module comprising a printed circuit board comprising circuitry for receiving the acquired measurements and transmitting the acquired measurements data.

3. The compliance management unit of claim 2, comprising at least one sensor for acquiring the measurements.

4. The compliance management unit of claim 3, wherein the at least one sensor comprises at least one of an accelerometer and a global positioning system (GPS) sensor.

5. The compliance management unit of claim 4, wherein the processing structure generates a user interface comprising at least one of the unique identifier, a status of the at least one of the sign and the sign post, an alert for a remedial action to be taken based on the predefined rules, a timestamp pertaining to the date and time of the alert, and battery life.

6. The compliance management unit of claim 3, wherein the at least one sensor is controlled to periodically acquire the measurements.

7. The compliance management unit of claim 3, wherein the sign is a traffic control device.

8. The compliance management unit of claim 3, wherein attributes of the at least one of the sign and the sign post comprise at least one of at least one of installation date, sign type, dimensions, substrate material, grade and manufacturer of reflective sheeting, manufacturer's name, batch number, manufacturer's certificate of conformity with government specifications, material grade, date of delivery, date of use and Material Data Sheet (MDS), location, jurisdiction, Manual of Uniform Traffic Control Devices (MUTCD) Code, face direction, sign face condition assessment, inspection date, reason for critical rating, last inspection dates and results, recent maintenance events, next scheduled inspection/maintenance, and post type.

9. The compliance management unit of claim 2, wherein the compliance module comprises an enclosure.

10. A compliance method for at least one of a sign and a sign post, the method comprising the steps of:

receiving at least one of sensed data acquired from at least one sensor associated with the at least one of the sign and the sign post, identification data, attribute data, and location data associated with the at least one of the sign and the sign post;

querying a compliance database having records associated with each of the at least one of the sign and the sign post;

determining at least one condition of each of the at least one of the sign and the sign post based on the at least one of the identification data, the attribute data, the acquired sensed data and the location data, predetermined criteria and maintenance data;

establishing a compliance risk assessment for each of the at least one of the sign and the sign post;

based on said compliance risk assessment, generating a recommendation and/or action to be taken to comply with predefined compliance requirements for the at least one of the sign and the sign post, and on a display screen, displaying the recommendation and/or the action to be taken to comply with the predefined compliance requirements for the at least one of the sign and the sign post.

11. The compliance method of claim 10, wherein the at least one sensor comprises at least one of an accelerometer and a global positioning system (GPS) sensor.

12. The compliance method of claim 10, wherein the at least one sensor is controlled to periodically acquire the measurements, and transmit the measurements data.

13. The compliance method of claim 10, wherein the sign is a traffic control device.

14. The compliance method of claim 10, wherein the attribute data of post comprises at least one of installation date, sign type, dimensions, substrate material, grade and manufacturer of reflective sheeting, manufacturer's name, batch number, manufacturer's certificate of conformity with government specifications, material grade, date of delivery, date of use and Material Data Sheet (MDS), location, jurisdiction, Manual of Uniform Traffic Control Devices (MUTCD) Code, face direction, sign face condition assessment, inspection date, reason for critical rating, last inspection dates and results, recent maintenance events, next scheduled inspection/maintenance, and post type.

* * * * *